(12) United States Patent
Tomaru

(10) Patent No.: US 6,873,726 B2
(45) Date of Patent: Mar. 29, 2005

(54) INFORMATION ADDING APPARATUS, INFORMATION EXTRACTING APPARATUS, INFORMATION ADDING METHOD, INFORMATION EXTRACTING METHOD, AND COMPUTER READABLE RECORDING MEDIUM

(75) Inventor: Takeshi Tomaru, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 875 days.

(21) Appl. No.: 09/804,036

(22) Filed: Mar. 13, 2001

(65) Prior Publication Data

US 2002/0025067 A1 Feb. 28, 2002

(30) Foreign Application Priority Data

Aug. 24, 2000 (JP) ........................................ 2000-254337

(51) Int. Cl.[7] ................................................. G06K 9/00
(52) U.S. Cl. ...................................... 382/162; 382/100
(58) Field of Search ................................ 382/162, 166, 382/100, 253

(56) References Cited

U.S. PATENT DOCUMENTS

| H001506 H | * | 12/1995 | Beretta | 345/591 |
| 5,659,726 A | * | 8/1997 | Sandford et al. | 380/54 |
| 5,875,249 A | * | 2/1999 | Mintzer et al. | 380/54 |

* cited by examiner

*Primary Examiner*—Phuoc Tran
(74) *Attorney, Agent, or Firm*—Staas & Halsey LLP

(57) ABSTRACT

An information adding apparatus forms an extended color table constituted by a non-extended portion and an extended portion in the case that an array of bits used as information is embedded in the unit of one bit into respective pixels of image data of an image file. Thereafter, the image adding apparatus produces image data to which an index value of the non-extended portion is set when a bit value embedded into a pixel is equal to "0", and also to which an index value of the extended portion is set when a bit value is equal to "1." This index value of the extended portion indicates the same RGB value as that indicated by the previously set index value.

16 Claims, 23 Drawing Sheets

ORIGINAL IMAGE (4 PIXELS x 4 PIXELS)

|  | X=0 | X=1 | X=2 | X=3 |
|---|---|---|---|---|
| Y=0 | 128 | 0 | 0 | 128 |
| Y=1 | 0 | 128 | 128 | 0 |
| Y=2 | 0 | 128 | 128 | 0 |
| Y=3 | 128 | 0 | 0 | 128 |

~51

* NUMERAL VALUES ARE RGB VALUES

INFORMATION ADDED TO IMAGE DATA:

ARAY OF BIT STREAM 0101010101010101

FIG. 22

COLOR TABLE IS EXTENDED IN ORDER TO ADD INFORMATION

| 44 | 45 | 46 | |
|---|---|---|---|
| 4 | 4 | 4 | 4 |
| 1 | 2 | 3 | 4 |
| 0 | 128 | 0 | 128 |
| 1 | 0 | 0 | 1 |
| 0 | 1 | 1 | 0 |
| 0 | 1 | 1 | 0 |
| 1 | 0 | 0 | 1 |

COLOR TABLE:
INDEX "0" DENOTES COLOR "0"
INDEX "1" DENOTES COLOR "128"
INDEX "2" DENOTES COLOR "0"
INDEX "3" DENOTES COLOR "128"
INDEX 2 AND 3 ARE EXTENDED

FIG. 23

CONDITION UNDER WHICH BITS OF BIT STREAM UPTO 4TH BIT ARE ADDED TO EXTENDED FORMAT

40

| 4 | 4 | 4 |
|---|---|---|
| 1 | 2 | 3 | 4 |
| 0 | 128 | 0 | 128 |

| 1 | 3 | 0 | 4 |
|---|---|---|---|
| 0 | 1 | 1 | 0 |
| 0 | 1 | 1 | 0 |
| 1 | 0 | 0 | 1 |

↖ 49

COLOR TABLE:
INDEX "0" DENOTES COLOR "0"
INDEX "1" DENOTES COLOR "128"
INDEX "2" DENOTES COLOR "0"
INDEX "3" DENOTES COLOR "128"
INDEX 2 AND 3 ARE EXTENDED

* WHEN BIT OF INFORMATION TO BE ADDED IS "0", NORMAL INDEX VALUE IS UTILIZED.
  WHEN BIT IS "1", INDEX VALUE OF EXTENDED PORTION IS USED.

FIG. 24

CONDITION UNDER WHICH ALL OF BIT STREAMS ARE ADDED

| 4 | 4 | 4 |
|---|---|---|

| 1 | 2 | 3 |
|---|---|---|
| 0 | 128 | 0 | 128 |

| 1 | 3 | 0 | 4 |
|---|---|---|---|
| 0 | 4 | 1 | 3 |
| 0 | 4 | 1 | 3 |
| 1 | 3 | 0 | 4 |

COLOR TABLE:
INDEX "0" DENOTES COLOR "0"
INDEX "1" DENOTES COLOR "128"
INDEX "2" DENOTES COLOR "0"
INDEX "3" DENOTES COLOR "128"
INDEX 2 AND 3 ARE EXTENDED

* WHEN BIT OF INFORMATION TO BE ADDED IS "0", NORMAL INDEX VALUE IS UTILIZED. WHEN BIT IS "1", INDEX VALUE OF EXTENDED PORTION IS USED.

INFORMATION ADDING APPARATUS, INFORMATION EXTRACTING APPARATUS, INFORMATION ADDING METHOD, INFORMATION EXTRACTING METHOD, AND COMPUTER READABLE RECORDING MEDIUM

BACKGROUND OF THE INVENTION

1. Field of the Invention

The present invention is related to an information adding apparatus and information adding method, capable of adding information to an image file, is also related to an information extracting apparatus and information extracting method, capable of extracting such information from an image file into which this information is added, and is further related to a computer-readable recording medium for recording thereon a computer program used to execute an information adding process operation and an information extracting process operation.

2. Description of the Prior Art

In conventional techniques for adding information to images, a portion of an original image is changed within a range where the changed image portion cannot be visibly discriminated, or recognized by human's visibility based upon the below-mentioned two facts, and then additional information is embedded into this changed original image:

(1). Presently available computers are capable of displaying very huge numbers of colors, namely 16 million colors.

(2). Since visibility of human eyes is not so sensitive, even when colors are slightly changed from original image displays, this color change cannot be visibly recognized, or discriminated from original colors by human eyes.

As a result, in the conventional technique for adding the information to the image, there is such a problem that the image display, or image representation into which the additional information has been embedded, or merged is changed from the display of the original image, although this color change cannot be visibly discriminated by human eyes.

Also, the conventional technique cannot be applied to simple images such as a black/white binary-coded image, since such a color change may be visibly recognized by human eyes.

SUMMARY OF THE INVENTION

The present invention has been made to solve the above-explained problems, and therefore, has an object to provide an information adding apparatus, an information adding method, an information extracting apparatus, and an information extracting method, capable of adding information to an image file, while a display mode of an image is not changed before/after an information adding process operation.

Also, the present invention owns another object to provide a recording medium for recording thereon a computer readable program by which these image adding method/image extracting method can be carried out.

To achieve the above-described objects, the present invention may employ the following arrangements.

That is to say, the present invention is such an information adding apparatus for adding additional information to an image file which contains a first table constructed of a table entry group to which index values are allocated, color information being defined to the respective table entries, and also contains image data in which the index values of the table entry group are set as color information of the respective pixels constituting an image. This information adding apparatus is featured by comprising: a table producing unit producing a table entry of a second table based upon the table entry of the first table; and an image data producing unit specifying a table entry of a table in correspondence with the additional information as to each of the pixels for constituting the image, and producing image data in which an index value corresponding to the specified table entry is set.

The table producing unit of the information adding apparatus preferably produces the second table in which the table entry group of the first table is copied in order to become power of 2 in response to a bit number of a unit bit which constitutes a unit in such a case that an array of bits indicative of the additional information is allocated to the respective pixels.

Also, the present invention is such an information extracting apparatus for extracting additional information contained in an image file which should be processed. This information extracting apparatus is featured by comprising: a table analyzing unit segmenting a table entry group of a table in which color information is defined in correspondence with an index value into a plurality of table entry groups, the table entry groups of the table being contained in the image file; and an information extracting unit specifying the table entry groups which are allocated as to the respective index values set to the respective pixels of the image data contained in the image data, and acquiring values corresponding to the specified table entry groups to thereby produce additional information.

The information extracting unit of the information extracting apparatus preferably acquires a value of a unit bit corresponding to the specified table entry group for every pixel of the image data, and arranges the acquired unit bits in a predetermined order so as to produce an array of bits representative of the additional information.

Also, the information extracting apparatus may be further comprised of a restoring unit restoring both the table and the image data into such conditions thereof obtained before the additional information is added, after the additional information has been produced by the information extracting unit.

Also, the present invention is such a recording medium for recording thereon a program used to cause a computer to execute an information adding method, an information extracting method, or either an information adding process operation or an information extracting process operation, which own substantially the same arrangements as those of the above-explained information adding apparatus and information extracting apparatus. These methods/process operations can achieve the object of the present invention.

Furthermore, the present invention is a computer readable recording medium for recording thereon an image file to which additional information is added, in which the image file contains both a table and image data; the table is arranged by a plurality of table entry groups to which color information corresponding to index values is set respectively; the image data holds index values corresponding to colors of respective pixels which represent an image; and the recording medium records thereon such an image file that the respective index values correspond to color information identical to color information corresponding to the respective index values which are set to the respective pixels of original image data, the original image data being equal to such image data to which a value corresponding to any one of the plurality of table entry groups is set in response to the additional information, and also before the additional information is added.

BRIEF DESCRIPTION OF THE DRAWINGS

For a better understanding of the present invention, reference is made of a detailed description to be read in conjunction with the accompanying drawings, in which:

FIG. 19 is an explanatory diagram for explaining operation of an embodiment of the present invention;

FIG. 22 is an explanatory diagram for explaining operation of an embodiment of the present invention;

FIG. 23 is an explanatory diagram for explaining operation of an embodiment of the present invention; and FIG. 24 is an explanatory diagram for explaining operation of an embodiment of the present invention.

DESCRIPTION OF THE PREFERRED EMBODIMENTS

Referring now to drawings, various preferred embodiments of the present invention will be described. Since arrangements of the embodiments are an illustration, the present invention is not limited to these embodiments.

Basic Idea of the Present Invention

First of all, as a basic idea of the present invention, an image saving format (image file) using a color table which may constitute a base of the present invention is described.

Figure 1:
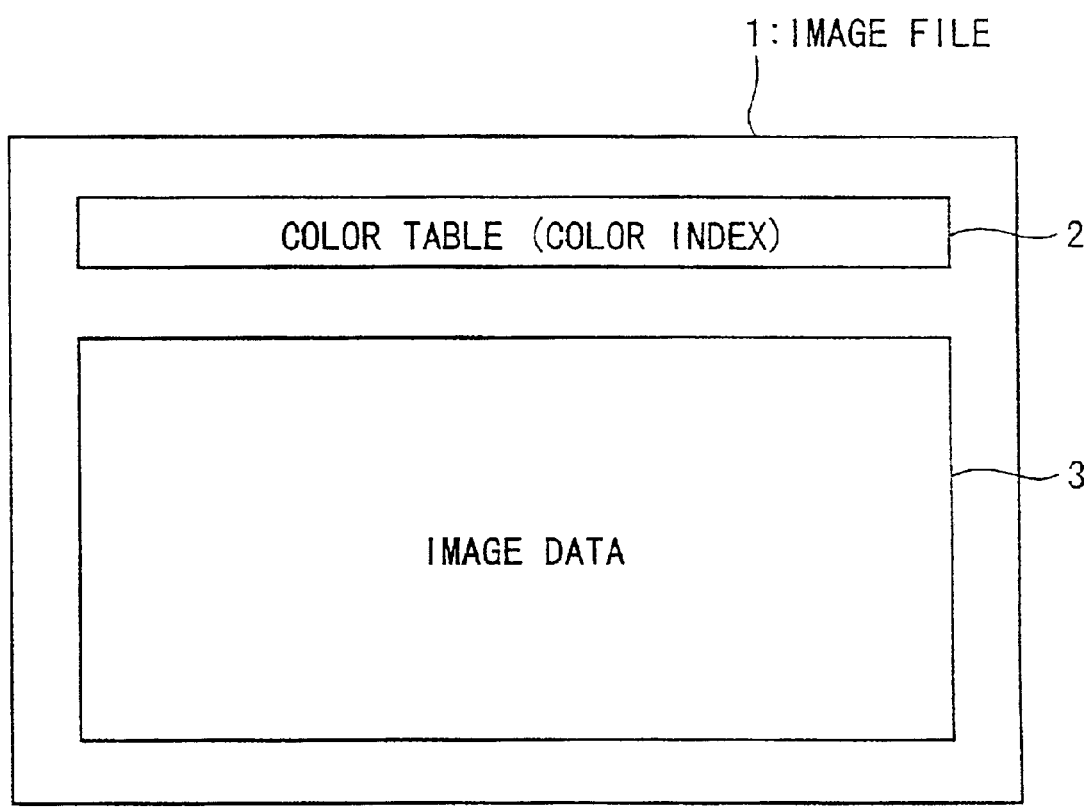
FIG. 1 is a diagram for illustratively showing an image saving format (image file) using a color table.

FIG. 1 is a diagram for illustratively indicating an image saving format (image file), while the color table used for general purpose is utilized. That is, an image file 1 contains as an element a color table (color index) 2 and image data 3. In an actual case, various elements such as an image size and transparent color information are required other than the elements shown in this drawing. However, since these elements have no direct relation with the present invention, these elements are omitted from in FIG. 1. As an example which employs such an image saving format, there are GIF, Windows BMP, and the like.

Figure 2:
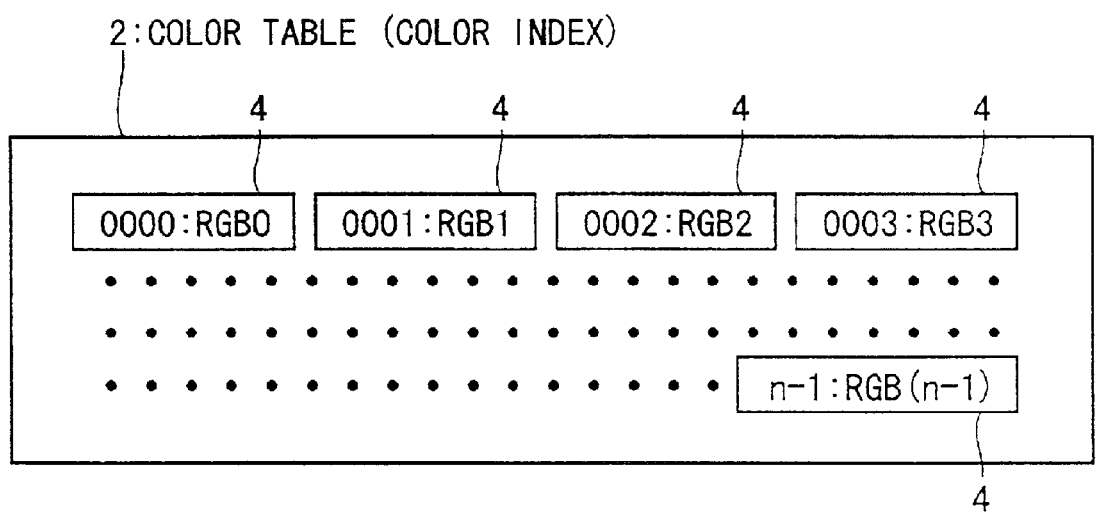
FIG. 2 is a diagram for illustratively indicating an example of the color table shown in FIG. 1.

FIG. 2 is a diagram for illustratively showing an example of the color table 2 indicated in FIG. 1. The color table 2 is constituted by a plurality of table entries 4, the total number of which is equal to a total number of colors required for displaying (representing) an image (maximum color number of subject image is equal to "n" pieces). In each of these table entries 4, one set of RGB values is stored, which may function as color information used to display an image. An index value is allocated to each of the table entries 4 as information indicative of a storage position (recording position) of RGB values. While the index value corresponds to, for example, a serial number (e.g., 0000, 0001, 0002, ..., n−1, n), continuous values are allocated as the index values in the storage order of the table entry 4.

Figure 3:
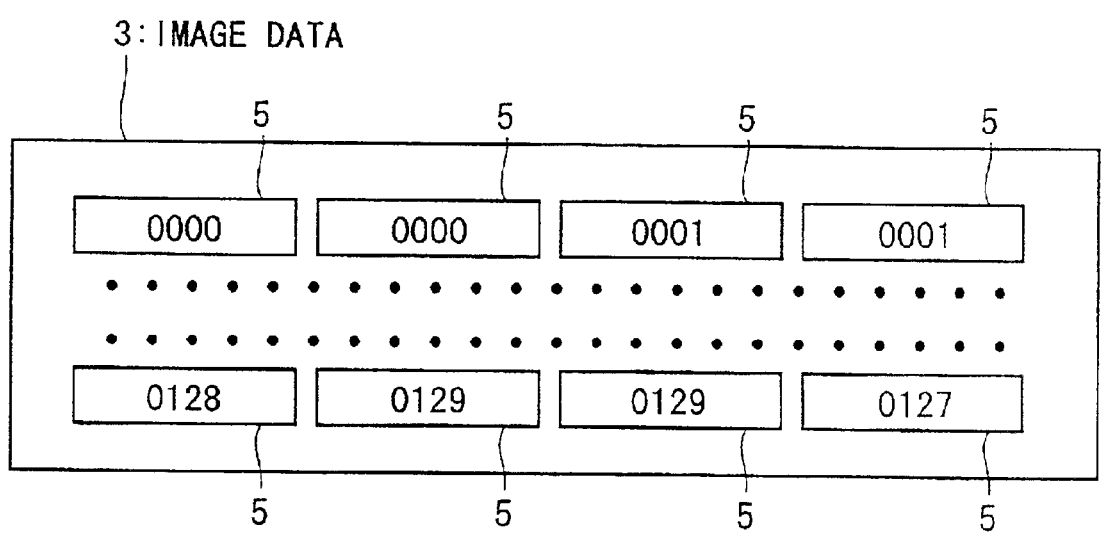
FIG. 3 is a diagram for illustratively representing an example of image data indicated in FIG. 1.

FIG. 3 is a diagram for illustratively showing an example of the image data 3 represented in FIG. 1. The image data 3 contains a plurality of elements 5 which correspond to a plurality of pixels. These plural pixels constitute an image. The respective elements are represented not by directly utilizing the RGB values used to represent colors of these pixels, but by employing the above-explained index values of the color table 2. In other words, the respective elements 5 do not hold the RGB values of the pixels, but hold the index values of the table entries 4 which store thereinto the RGB values of the pixels.

Figure 4:
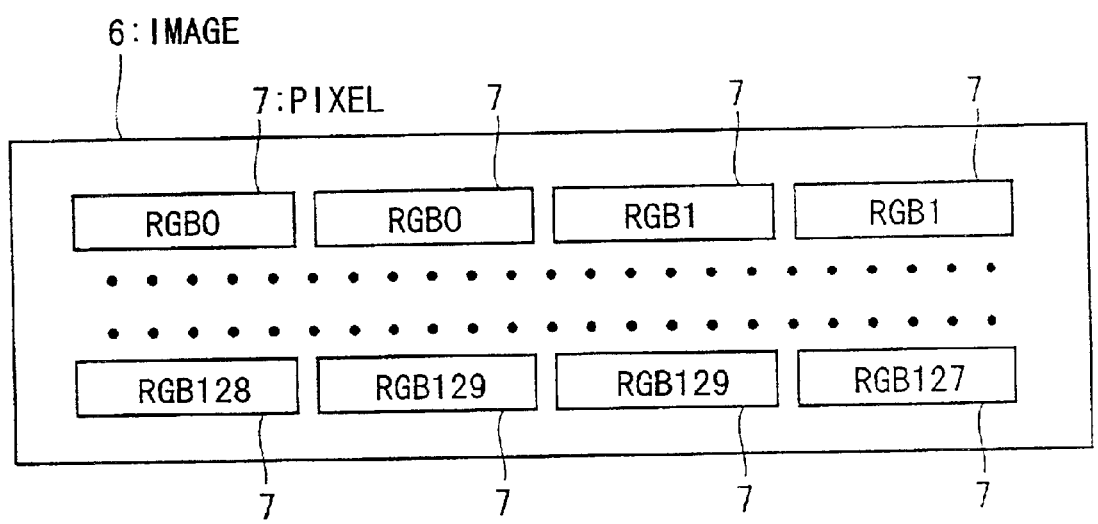
FIG. 4 is a diagram for illustratively indicating an image displayed by employing the color table of FIG. 2 and the image data of FIG. 3.

FIG. 4 is a diagram for illustratively showing an image 6 which is represented by the color table 2 shown in FIG. 2 and the image data 3 indicated in FIG. 3. When the image 6 is displayed, colors of respective pixels 7 may be obtained by retrieving the RGB values corresponding to the respective elements 5 of the image data 3.

Next, a description will now be made of an image saving format (image file), an image adding method, and an image extracting method, which may be provided by the present invention.

Figure 5:
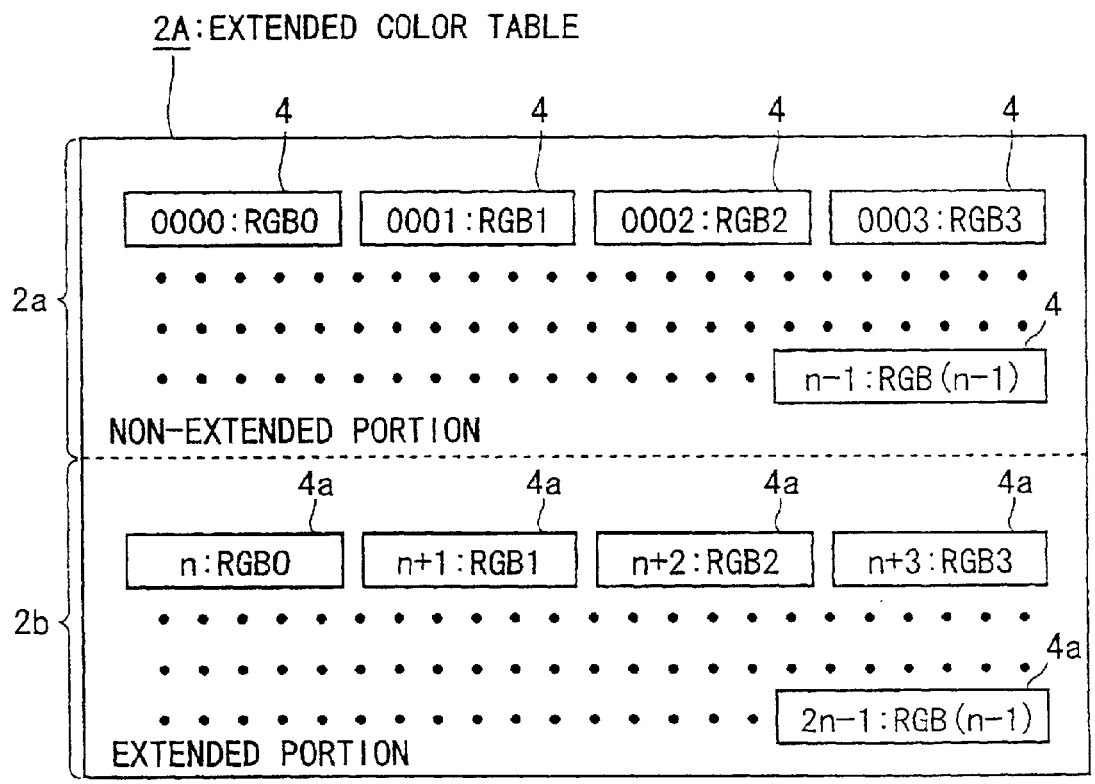
FIG. 5 is a diagram for illustratively representing an extended color table.

FIG. 5 is a diagram for illustratively showing an extended color table 2A (corresponding to table according to the present invention). This extended color table 2A has been extended in order to embed additional information into the image file 1. The extended color table 2A is constituted by a non-extended portion 2a and an extended portion 2b. This non-extended portion 2a corresponds to the color table 2 shown in FIG. 1 and FIG. 2.

The extended portion 2b holds a plurality of table entries 4a. These table entries 4a hold the same RGB values as the RGB values which are held by the non-extended portion 2a. The extended portion 2b may be formed by copying the color table 2 in such a manner that a summation between the non-extended portion 2a and the extended portion 2b becomes power of 2 (namely, 2, 4, 8, 16, . . . ).

Index values different from those of the non-extended portion 2a are allocated to the respective table entries 4a contained in the extended portion 2b. In this example, such index values subsequent to the index number of the table entry 4 which is finally stored in the non-extended portion 2a are allocated.

In FIG. 5, there is shown an example of the extended color table 2A which is formed by multiplying the color table 2 by 2 (namely, summation between non-extended portion 2a and extended portion 2b becomes 2). Such index numbers (n, n+1, n+2, . . . , 2n−1) subsequent to the final index number "n−1" which is allocated to the respective table entries 4 of the non-extended portion 2a are allocated to the respective table entries 4a of the extended portion 2b. As previously explained, in accordance with the present invention, the color table area is required which is equal to power of 2 of the maximum color number (total number of colors used to represent image) "n" of the image.

Figures 6, 7:
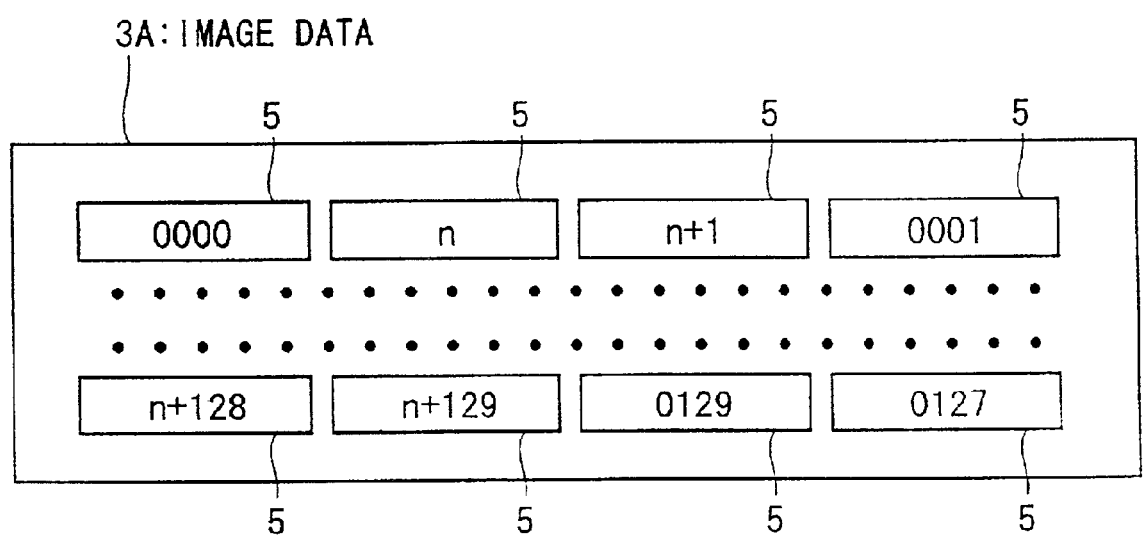
FIG. 6 is a diagram for showing an example of information (additional information) which is embedded in image data.
FIG. 7 is a diagram for illustratively showing image data obtained by embedding the additional information shown in FIG. 6 into the image data shown in FIG. 3, while using the extended color table shown in FIG. 5.

FIG. 6 is a diagram for illustratively indicating an example of information (additional information) 15 which is embedded with respect to image data. There is no limitation in sorts (definition as information) of the additional information 15 to be embedded, but the additional information 15 is merely interpreted as a simple array of bits (namely, bit stream). The bit array as the additional information 15 has no question as to whether or not a compression process operation has been applied thereto.

FIG. 7 is a diagram for illustratively showing image data 3A which is produced by embedding the additional information 15 shown in FIG. 6 into the image data 3 shown in FIG. 3 by using the color table 2A in FIG. 5. Each of the elements 5 of the image data 3A holds an index value of the non-extended portion 2a with respect to a bit "0" of the additional information 15, and also an index value of the extended portion 2b with respect to a bit "1" of the additional information 15. The image data 3A into which the information 15 is embedded (namely, is added) may be produced in such a manner. A size of this image data 3A is not changed from the size of the image data 3 of the original image.

Figure 8:
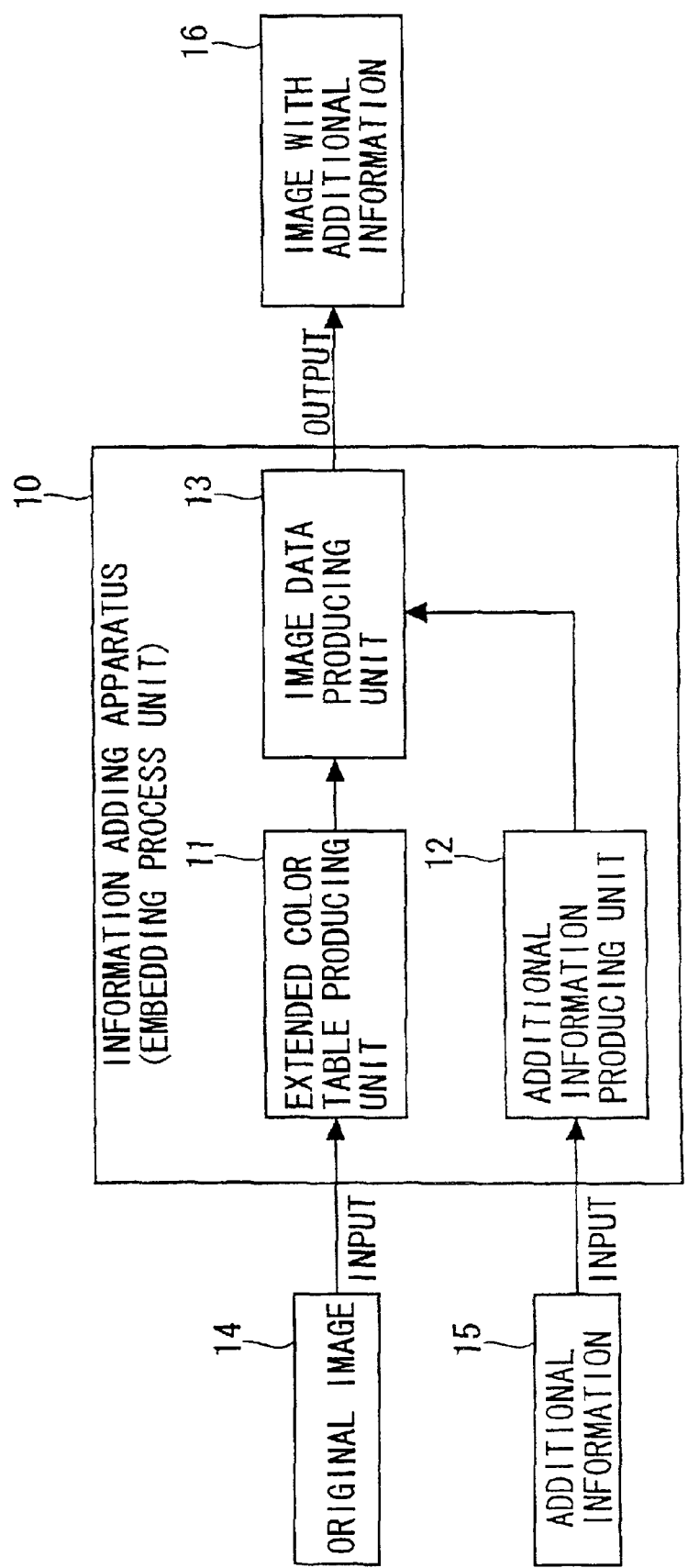
FIG. 8 is a schematic block diagram for showing a basic construction of an information adding apparatus according to the present invention.

FIG. 8 is a schematic block diagram for indicating a basic arrangement of an information adding apparatus 10, according to the present invention, capable of executing the process operations shown in FIG. 5 to FIG. 7. In FIG. 8, the information adding apparatus 10 is equipped with an extended color table producing unit 11, an additional information processing unit 12, and an image data producing unit 13.

The information adding apparatus 10 executes the below-mentioned information embedding process operation (namely, information adding process operation). As an initial condition, while the additional information 15 and an image saving format 14 are prepared, both the additional information 15 and the image saving format 14 are inputted into the information adding apparatus 10. The additional information 15 is embedded into this image saving format (will be referred to as an "image file"; "original image" hereinafter). The original image 14 owns the color table 2 shown in FIG. 2, and the image data 3 indicated in FIG. 3.

The original image 14 inputted into the information adding apparatus 10 is entered into the extended color table producing unit 11. As a result, the extended color table producing unit 11 performs an extended color table producing process operation. In other words, the extended color table producing unit 11 forms the extended color table 2A shown in FIG. 5 from the color table 2 contained in the original image 14.

In this case, as shown in FIG. 5, a dimension (size) of the extended color table 2A is formed by using plural colors two times larger than a total number of colors capable of representing an image (namely, twice the size as that of color table 2).

While the extended portion 2b constitutes a pair with respect to the RGB values of the non-extended portion 2a, index values subsequent to the index numbers which have been allocated to the respective table entries 4 of the non-extended portion 2a are allocated to the respective table entries 4a.

In other words, the continuous index values are allocated to both the respective table entries 4 of the non-extended unit 2a and the respective table entries 4a of the extended portion 2b respectively. Thereafter, the extended color table producing unit 11 enters the original image 14 having the extended color table 2A into the image data producing unit 13.

On the other hand, the additional information 15 inputted to the information adding apparatus 10 is entered into the additional information processing unit 12. The additional information processing unit 12 executes a preprocessing operation such as the compression process operation of the additional information 15 as the additional information processing operation with respect to the additional information 15.

Since the additional information 15 is compressed and the like by performing the preprocessing operation, a large amount of information can be added with respect to the original image 14. Thereafter, the additional information processing unit 12 inputs the additional information 15 to which the preprocessing operation has been carried out, into the image data processing unit 13.

When the image data processing unit 13 receives the original image 14 from the extended color table processing unit 11, and also receives the additional information 15 from the additional information processing unit 12, this image data producing unit 13 executes an image data producing processing operation. In other words, the image data producing unit 13 produces such an image data 3A as indicated in FIG. 7, while observing the value of the unit bit in such an assumption that the preprocessed-additional information 15 is assumed to be an array of bits.

In this case, a unit bit implies such a bit which constitutes a unit of an embedding process operation by which the array of the bits of the additional information 15 is embedded into the respective pixels which constitute the image. This unit bit is constituted by an arbitrary number of bits. In this example, the unit bit is equal to 1 bit (either "0" or "1")

Concretely speaking, the image data producing unit 13 executes the below-mentioned process operation with respect to all of the elements 5 contained in the image data 3. That is, the image data producing unit 13 specifies a certain element 5 (pixel) contained in the image data. Next, the image data producing unit 13 derives a unit bit from the bit stream. This derived unit bit should be set to a specified pixel.

Subsequently, the image data producing unit 13 sets an index value corresponding to the RGB values of the specified pixel based upon the value of the derived unit bit and the color information (RGB value) of the specified pixel. In other words, when the value of this unit bit is "0", the image data producing unit 13 sets the index value of the non-extended portion 2a to the specified element 5, whereas when the value of the unit bit is "1", the image data producing unit 13 sets the index value of the extended portion 2b to the specified element 5. At this time, the index value set to the element 5 designates such color information (RGB value) which has been set with respect to the specific pixel before the information adding process operation is carried out, irrespective of such a fact that this index value corresponds to either one owned in the non-extended portion 2a or one owned in the extended portion 2b.

In this case, the image data producing unit 13 sequentially executes the above-described process operation as to the additional information 15 from the head additional information in the unit of the unit bit, and further, as to the image data from the head pixel thereof. Since the index values of the RGB values of the respective pixels contained in the image data 3 are reset in this manner, the image data 3A is produced. It should be noted that the above-explained relationship among the values ("0" and "1") of the bit, the non-extended portion 2a, and the extended portion 2b may be alternatively reversed.

When the production of the image data 3A is ended, such an image file 16 (will be referred to an "image with additional information 16" hereinafter) in which the additional information 15 has been added to the original image 14. Then, the image with the additional information 16 is outputted from the information adding apparatus 10.

The above-explained description describes such a case that the unit bit is equal to 1 bit. It should also be noted that the number of this unit bit may be arbitrarily selected. Then, when the bit number of this unit bit is increased by 1 bit, the summation between the non-extended portion and the extended portion contained in the extended color table is increased by the multiplication of power of 2.

For instance, in the case that the unit bit is set by employing 2 bits, the summation between the non-extended portion and the extended portion becomes 4. In such a case that the unit bit is set by using 3 bits, the summation between the non-extended portion and the extended portion becomes 8.

When the unit bit is set by using 2 bits, an extended color table containing a non-extended portion, and first to third extended portions is formed by the extended color table producing unit 11. These first to third extended portions hold a plurality of RGB values identical to the plural RGB values held in the non-extended portion, and index values allocated to the respective RGB values are mutually different from index values allocated to the non-extended portion and other extended portions.

The index values which are allocated to the non-extended portion and the first to third extended portions are brought into mutually different states by allocating, for example, continuous index values. For example, in such a case that the index values as shown in FIG. 5 are allocated to both the non-extended portion and the first extended portion, the index values defined from "2n" up to "3n−1" are allocated to the respective table entries of the second extended portion, whereas the index values defined from "3n" up to "4n−1" are allocated to the respective table entries 4a of the third extended portion, respectively.

On the other hand, in the image data producing process operation executed in the image data producing unit 13, assuming now that a single pixel is made in correspondence with each of unit bits contained in the additional information 15, the index values of either the non-extended portion or the extended portion, which correspond to the values of the unit bits and the color information of the pixels, are allocated to the element 5 of the image data.

For example, in the case that the unit bit is set by employing 2 bits, it is so assumed that in the image data producing unit 13, with respect to an array of bits which constitute the additional information 15, a single pixel (namely, element 5 of image data 3) is made in correspondence with these bits from a head bit, or a last bit for every 2 bits.

Then, based upon both the value (any one of "00", "01", "10", and "11") of the unit bit (2 bits) and the color information of the pixel, any of the index values of the non-extended portion and the first to third extended portions is set to the element 5 of the image data 3.

For example, in the case that the unit bit value is equal to "00", the index value of the non-extended portion is set to the element 5, whereas in the case that the unit bit value is equal to "01", the index value of the first extended portion is set to the element 5. Also, in the case that the unit bit value is equal to "10", the index value of the second extended portion is set to the element 5, whereas in the case that the unit bit value is equal to "11", the index value of the third extended portion is set to the element 5.

As apparent from the foregoing description, the correspondence relationship among the unit bit values, the non-extended portion, and the first to third extended portions (index values) may be properly set under such a condition that the color information (RGB value) of the pixel specified by the index value is not changed before/after the image data producing process operation is carried out.

It should be noted that in this case, the saving format of the concrete image with the additional information is not indicated. This is because the inventive idea of the present invention may be utilized and/or may be made in correspondence with an arbitrary image saving format established by using a color table. Further, in FIG. 8, the description is made of the information adding apparatus 10 containing the additional information processing unit 12. Alternatively, when the preprocessing operation is not carried out with respect to the additional information 15, this additional information processing unit 12 is no longer required.

Figure 9:
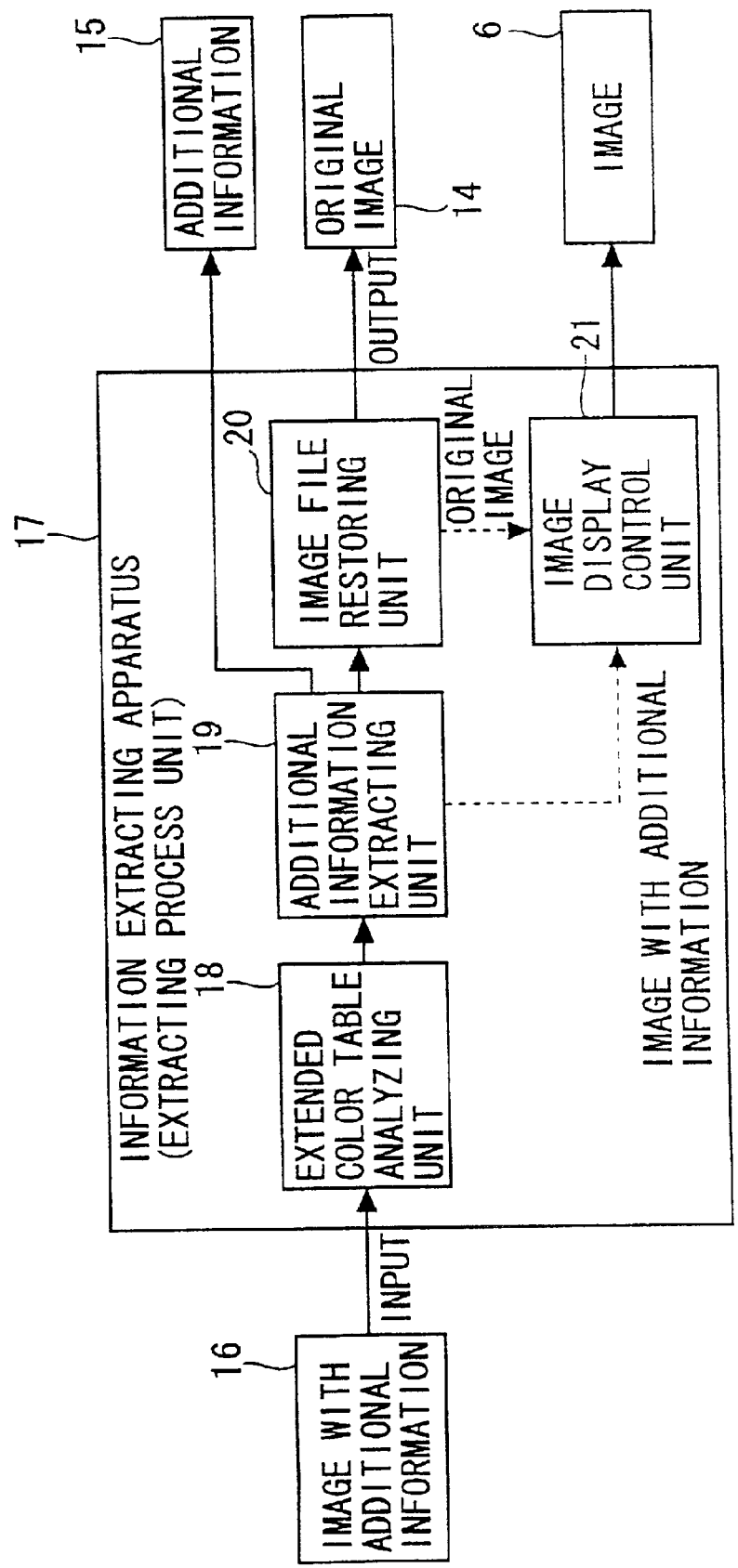
FIG. 9 is a schematic block diagram for indicating a basic construction of an information extracting apparatus according to the present invention.

FIG. 9 is a schematic block diagram for representing a basic arrangement of an information extracting apparatus 17—for extracting the additional information 15 from the image with the additional information 16 which is formed by executing the process operations shown in FIG. 5 to FIG. 7, or by the image adding apparatus 10 shown in FIG. 8.

In FIG. 9, the information extracting apparatus 17 is arranged by an extended color table analyzing unit 18 (will be simply referred to as an "analyzing unit 18" hereinafter), an additional information extracting unit 19, an image file restoring unit 20, and an image display control unit 21.

The information extracting apparatus 17 executes the below-mentioned information image extracting process operation. First, the image with the additional information 16 is prepared. It is so assumed that this image with the additional information 16 contains the extended color table 2A and the image data 3A, as shown in FIG. 5.

When the image with the additional information 16 is inputted to the information extracting apparatus 17, this entered image with the additional information 16 is inputted to the analyzing unit 18. The analyzing unit 18 analyzes the extended color table 2A of the image with the additional information 16 so as to discriminate the non-extended portion 2a from the extended portion 2b.

As described above, the respective RGB values of the non-extended portion 2a of the extended color table 2A are paired with the respective RGB values of the extended portion 2b thereof. Then, a total number of these RGB values stored in the respective table entries 4 of the non-extended portion 2a indicates a total number of the colors of the image represented by the image with the additional information 16.

The extended color table 2A is formed by duplicating the color table 2A. As a consequence, the RGB values of the respective table entries 4 and 4a contained in the extended color table 2A constitute repetition patterns. For example, the analyzing unit 18 may separate, or discriminate the non-extended portion 2a of the extended color table 2A from the extended portion 2b thereof by detecting a boundary portion of these repetition patterns.

It should be understood that the discrimination process operation between the non-extended portion 2a and the extended portion 2b by the analyzing unit 18 may be realized by employing other discrimination manners. Also, in such a case that the number of this unit bit is larger than, or equal to 2, the analyzing unit 18 separates one non-extended portion of the extended color table from a plurality of extended portions thereof by employing the above-explained discrimination manner. Both the analysis results (namely, separated results) by the analyzing unit 18 and the image with the additional information 16 are applied to the additional information extracting unit 19.

The additional information extracting unit 19 refers to the respective elements 5 of the image data 3A contained in the image with the additional information 16 in a preselected order, and checks as to whether or not the index value of each of the elements 5 corresponds to any one of the index value of the non-extended portion 2a and the index value of the extended portion 2b based upon the analysis result of the analyzing unit 18.

In other words, the additional information extracting unit 19 checks as to whether a pixel corresponding to each of the elements 5 is represented by the index value of the non-extended portion 2a, or by the index value of the extended portion 2b.

Then, the additional information extracting unit 19 acquires a value of a unit bit based on the check result of the index value of each of the elements 5, and then arrays the acquired values of the unit bits in one row in a predetermined sequence so as to form an array of bits which constitute the additional information 15.

For instance, when the index values held in the element 5 are the index values ("0000" to "n−1") of the non-extended portion 2a, the additional information extracting unit 19 acquires "0" as the value of the unit bit. When the index values held in the element 5 are the index values ("n" to "2n−1") of the extended portion 2b, the additional information extracting unit 19 acquires "1" as the value of the unit bit. It should be also noted that the correspondence relationship between the unit bit value ("0", or "1") and the index value may be reversed.

In such a case that the preprocessing operation (compressing process operation) has been carried out with respect to the acquired additional information 15 (bit array) in the information adding apparatus 10, the additional information extracting unit 19 executes an expanding process operation for this additional information 15, so that this additional information 15 is returned to the preceding state thereof before the preprocessing operation is carried out. Then, the additional information 15 is outputted from the information extracting apparatus 17. It should be understood that the outputted additional information 15 is further processed in accordance with the definition applied thereto.

The image file restoring unit 20 receives the image with the additional information 16 after the additional information 15 has been extracted by the additional information extracting unit 19. The image file restoring unit 20 performs such a restoring process operation capable of altering both the extended color table 2A and the image data 3A to both the color table 2 and the image data 3 (namely, extended color table 2A and image data 3A are returned to conditions thereof before additional information 15 is added) As a result, the image with the additional information 16 is returned to the original image 1.

It should be noted that the image file restoring unit 20 does not constitute the necessary structural elements of the information extracting apparatus 17 according to the present invention. However, if this image file restoring unit 20 is provided with the information extracting apparatus 17, then after the additional information 15 has been extracted, this extracted additional information may be deleted from the image file. As a consequence, it is possible to reduce such a possibility that the additional information 15 may be acquired from the image with the additional information 16 by a third party after this deletion. Accordingly, the image file restoring unit 20 has a merit in such a case that the additional information 15 owns secrecy. Also, since a size of an image file may be reduced by way of the restoring process operation, a recording area of a recording medium capable of recording thereon the image file may be effectively utilized.

The image display control unit 21 receives either the image with the additional information 16 or the restored original image 14 by setting as to whether or not the restoring process operation is carried out by the image file restoring unit 20. As a result, the image display control unit 21 acquires RGB values corresponding to the index values of the respective elements 5 contained in the image data 3A (image data 3) by retrieving the content of the extended color table 2A (color table 2).

As a result, the RGB values of the respective pixels which constitute the image may be obtained, and thereafter, such an image 6 may be represented, or displayed in accordance with the acquired RGB values. At this time, it should be understood that the RGB values obtained from the index values before the additional information 15 is added (original image 14) are not different from those after the additional information 15 has been added (namely, image with additional information 16). As a consequence, the image 6 may be displayed in the same representation mode irrespective of such a fact as to whether or not the additional information 15 is present.

It should also be understood that the process operation itself executed by the image display control unit 21 is similar to that of the prior art. Also, this image display control unit 21 does not constitute one of the necessary structural elements of the information extracting apparatus 17 according to the present invention, and therefore, may be omitted from this information extracting apparatus 17.

Embodiments

Figure 10:
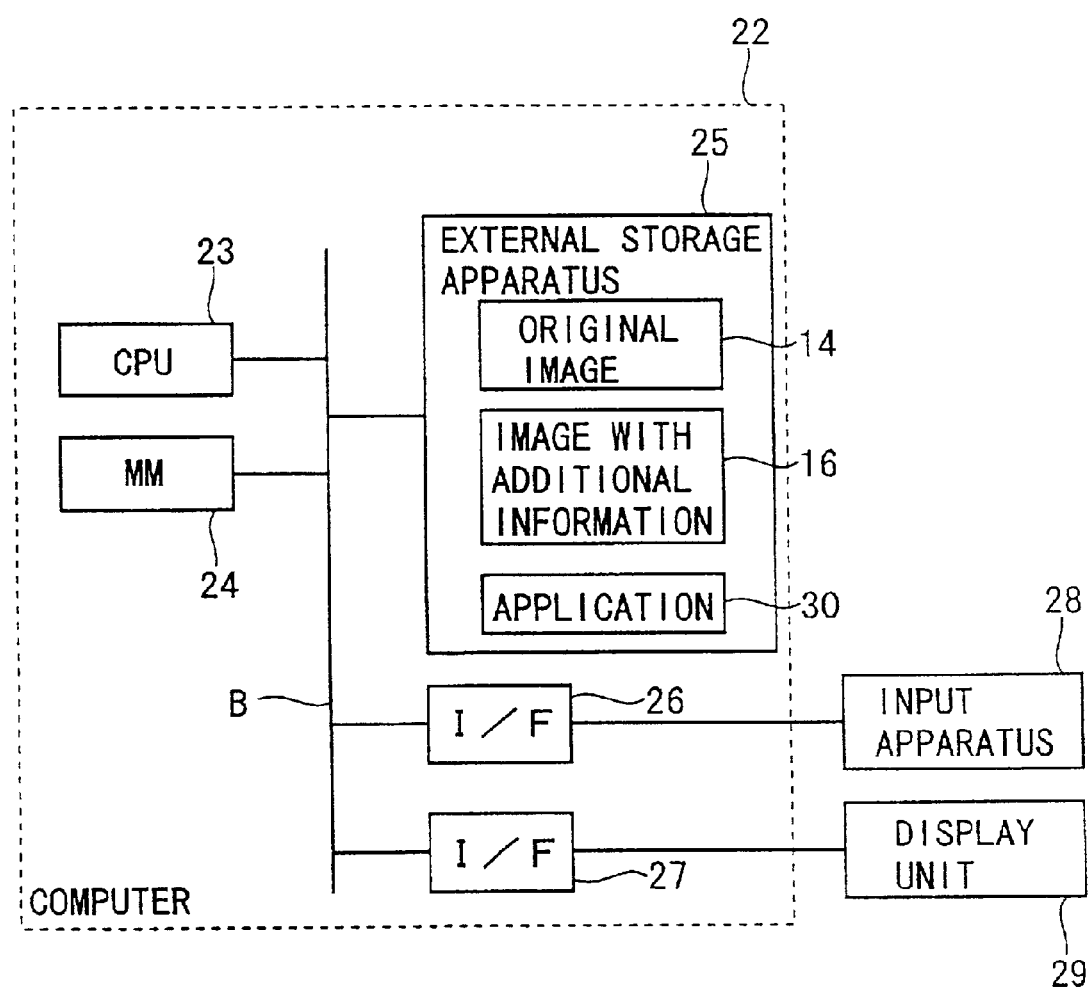
FIG. 10 is a schematic block diagram for representing a hardware structural example of a computer capable of realizing both an information adding apparatus and/or an information extracting apparatus.

Next, a description will now be made of various embodiments with respect to the above-explained information adding apparatus 10 and information extracting apparatus 17. FIG. 10 is a diagram for schematically indicating a hardware structural example of a computer 22. This computer 22 may realize both the information adding apparatus 10 and the information extracting apparatus 17.

The computer 22 may include all of the below-mentioned information processing apparatus capable of handling image files, namely, may cover a personal computer, a workstation, a mobile computer, upper-graded computers related to the fore-mentioned information processing appliances, a PDA (Personal Digital Assistant), an electronic notebook, a portable telephone, an AV (Audio Visual) appliance such as a telephone and a VTR, and a car navigation terminal unit.

As indicated in FIG. 10, the computer 22 is provided with a CPU (Central Processing Unit) 23, a main memory (MM) 24, an external storage apparatus 25, and interface circuits (I/F) 26, 27, which are mutually connected via a bus B to each other.

An input apparatus (pointing device such as keyboard and mouse) 28 is connected to the I/F 26. A display apparatus 29 such as a display unit (cathode-ray table), a liquid crystal display (LCD), and a plasma display is connected to the I/F 27.

The external storage apparatus 25 may be arranged by employing a readable/writable recording medium. This readable/writable recording medium is known from a magnetic disk (e.g., hard disk, and floppy disk), an optical disk (such as PD), an opt-magnetic disk (MO), and a semiconductor memory and the like. Both this external storage apparatus 25 and the MM 24 correspond to a storage medium according to the present invention.

As apparent from the foregoing explanation, in addition to the above-described various storage media, the recording medium of the present invention may involve such recording media as an EPROM, an EEPROM, a flash memory, smart media, a compact flash memory, and a memory stick. Also, a read-only recording medium such as a CD-ROM may be involved in this storage medium of the present invention.

The external storage apparatus 25 stores thereinto a computer program executed by the CPU 23, and also data used while the computer program is executed. This computer program involves an operating system (OS) and various sorts of application programs.

Among the programs stored in the external storage apparatus 25, such an application program 30 is contained. This application program 30 may cause the computer 22 to be operated to function as both the information adding apparatus 10 and the information extracting apparatus 17, according to the present invention.

Also, the external storage apparatus 25 stores thereinto either a single piece or plural pieces of original images (namely, image files to which no additional image is added) 14, which should be processed by the above-explained information adding process operation and also information extracting process operation, and further either a single piece or plural pieces of images with additional information (namely, image files to which additional information is added) 16.

The main memory (MM) 24 is arranged by employing a readable/writable semiconductor memory such as a RAM (random access memory). The MM 24 is used as a work area of the CPU 23. A program executed by the CPU 23 is loaded on this MM 24, and further, an execution result of the program is saved in this MM 24. Also, this MM 24 is used as a video memory capable of storing data such as a text and an image displayed on the display unit 29.

The CPU 23 loads a computer program to be executed from the external storage apparatus 25 to the MM 24, and then executes this computer program. Since the CPU 23 loads the application program 30 to the MM 24 so as to execute this loaded application program 30, the above-explained information adding process operation and also the information extracting process operation is carried out.

In other words, the computer 22 may function as the information adding apparatus 10, and also may function as the information extracting apparatus 17, while the CPU 23 executes the application program 30. The information adding apparatus 10 is equipped with the extended color table producing unit 11, the additional information processing unit 12, and the image data processing unit 13. The information extracting apparatus 17 is equipped with the extended color table analyzing unit 18, the additional information extracting unit 19, and the image file restoring unit 20.

Figure 11:
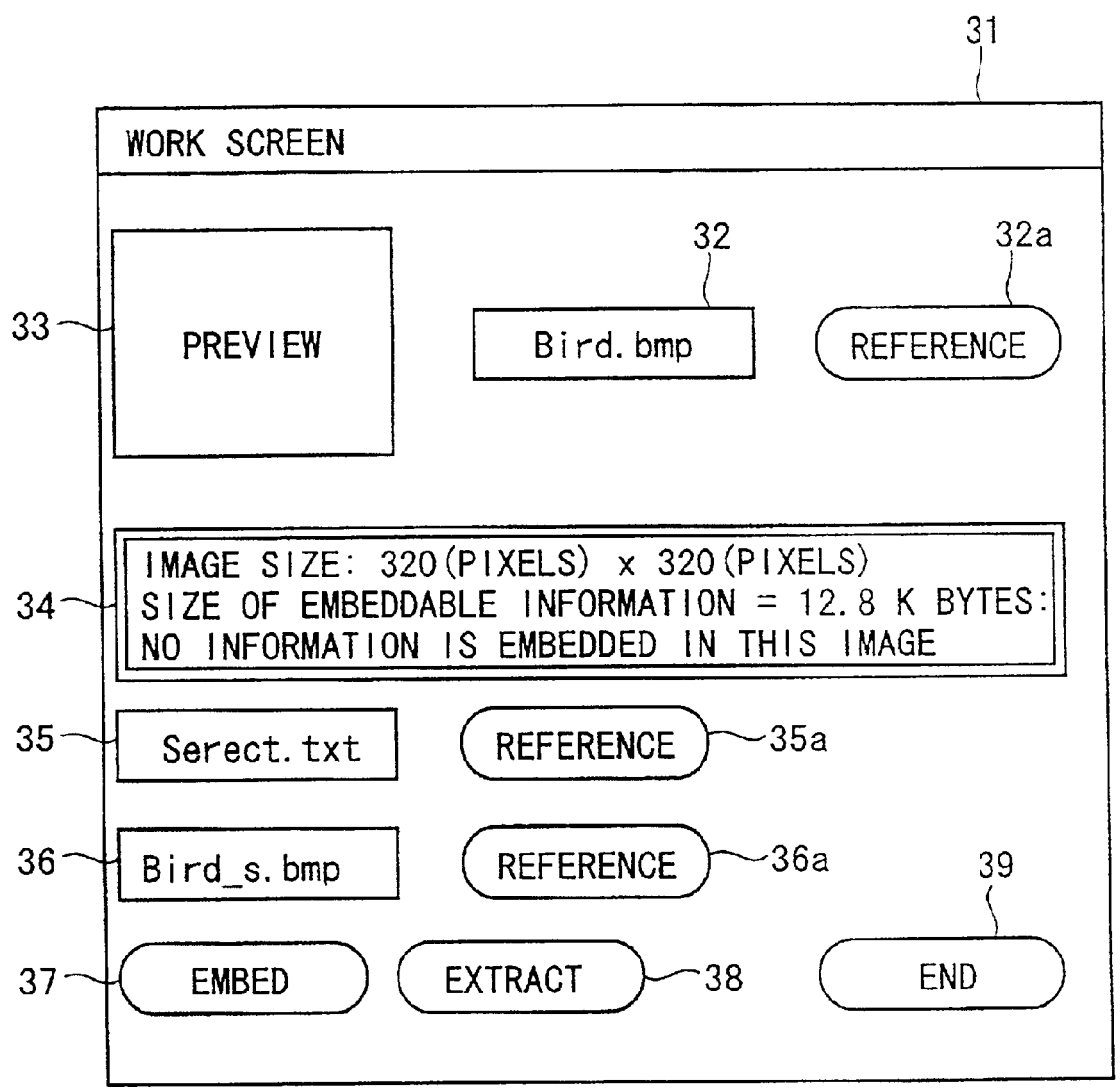
FIG. 11 is a diagram for illustratively showing a display example of an operation screen as to both the information adding process operation and the information extracting process operation displayed on a display unit of FIG. 10.

FIG. 11 is a diagram for illustratively showing a display example of a work screen of both the information adding process operation and the information extracting process operation, which are displayed on the display unit 29 by executing the application program 30 by the CPU 23.

As indicated in FIG. 11, a work screen 31 is provided with a display area 32 of an image file name; a plurality of reference buttons 32a, 35a, 36a; a preview display area 33; a display area 34 of image information; a display area 35 for displaying a file name of additional information; a display area 36 for displaying a name of an image file which has been processed by either the information adding process operation or the information extracting process operation; an embedding button 37; an extracting button 38; and further, an end button 39 of the application program 30.

On the display area 32, an image file name of either the original image 1 or the image with the additional information 16 is displayed, which are to be processed in accordance with the information adding process operation, or the information extracting process operation. The image file name displayed on the display area 32 is designated from the image file saved in the external storage apparatus 25. The image file name may be designated as follows. For example, an operator of the computer 22 may write a desirable file name into the display area 32 by using the input apparatus 28.

Also, the designation operation may be carried out by employing the reference button 32a corresponding to the display area 32. In other words, when the reference button 32a is depressed (clicked) by manipulating a mouse cursor (not shown), a list (not shown) of file names of image files which are stored in the external storage apparatus 25, and which should be processed by way of either the information adding process operation or the information extracting process operation as displayed. The operator may designate a desirable image file from the displayed list.

On the display area 33, a preview of an image made based upon such an image file designated by using the display area 32 is displayed. This designated image file implies such an image file that an image file name is displayed on the display area 32 (will be referred to as a "designated file" hereinafter).

On the display area 34, information (image-related information) related to the image of the designated file is displayed. For example, a size of an image, either a byte number or a bit number of additional information which may be embedded into the image data of the designated file, and information indicating as to whether or not additional information is embedded into the image data of the designated file are displayed as the image-related information on this display area 34. The image size defines a total number of pixels which are obtained by multiplying a total pixel number of the image along a height direction (Y direction) of the image by a total pixel number of this image along a width direction (X direction) thereof.

In response to a designation operation made by an operator, a file name of additional information is displayed on the display area 35. This additional information is embedded into the designated file, or is extracted from the designated file. The file of the additional information is designated in such a manner that the operator writes the file name into the display area 35. Also, when the reference button 35a corresponding to the display area 35 is depressed, a list (not shown) of the file names of the additional information is displayed. Alternatively, the operator may designate the file of the additional information from the list.

In response to a designation operation made by the operator, a file name of an image file is displayed on the display area 36. This image file has been processed by executing either the information adding process operation or the information extracting process operation. This designation operation may be performed in such a way that, for example, the operator writes the file name of the processed image into the display area 36. Alternatively, while a list (not shown) of the file names is displayed by depressing the reference button 36a provided in correspondence with the display area 36, a desirable file name may be designated from the list.

The embedding button 37 corresponds to a starting button of the information adding process operation. When the embedding button 37 is depressed by manipulating the input apparatus 28 (for example, by clicking mouse), the information adding process operation with respect to the designated file is commenced.

The extracting button 38 corresponds to a starting button of the information extracting process operation. When the extracting button 38 is depressed by manipulating the input apparatus 28 (for example, by clicking mouse), the information extracting process operation with respect to the designated file is commenced.

Figure 12:
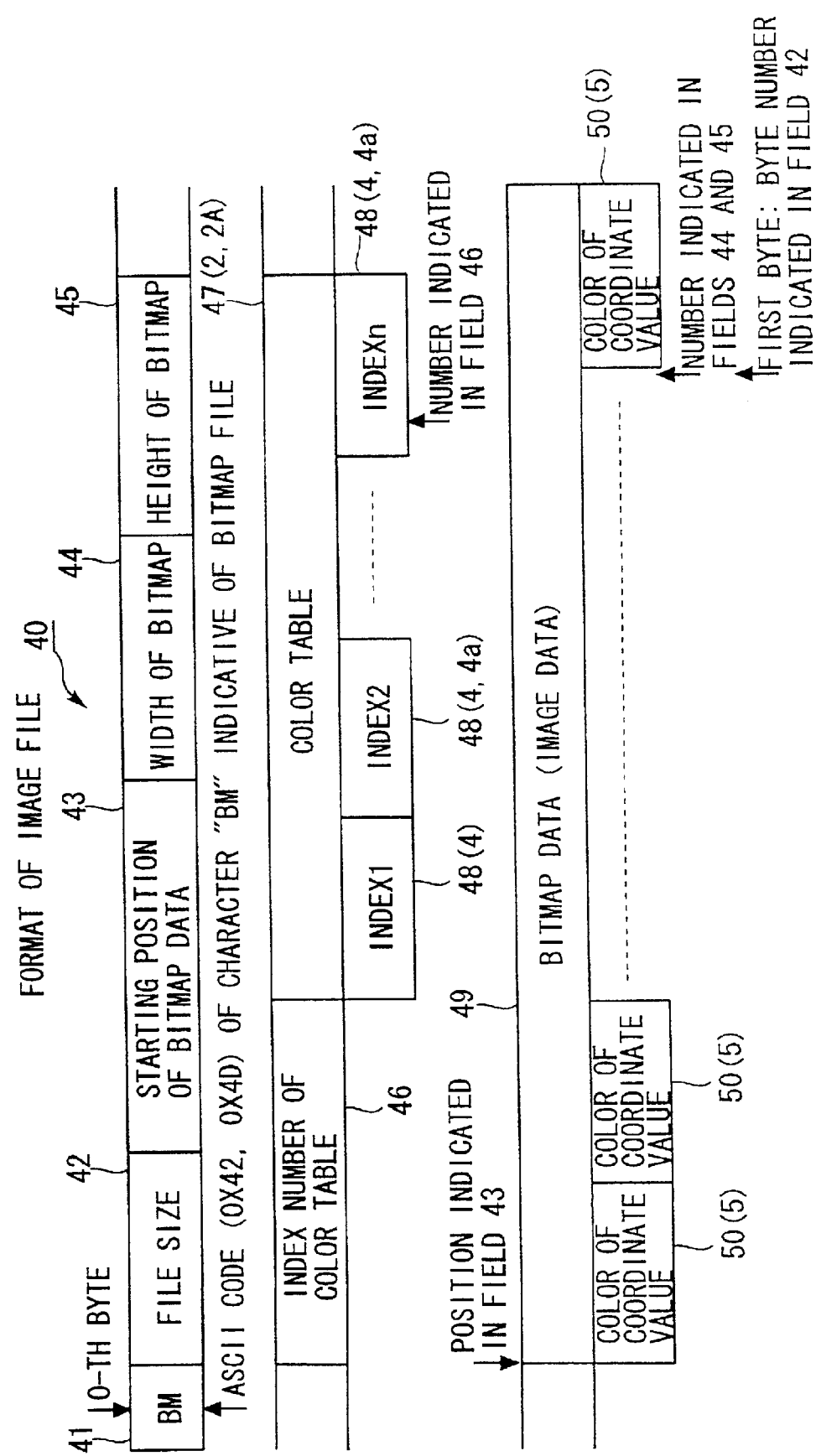
FIG. 12 is an explanatory diagram for explaining a format of an image file.

FIG. 12 is a diagram for illustratively showing a conceptional idea of a format of such an image file which should be processed by way of either the information adding process operation or the information extracting process operation in this embodiment. In FIG. 12, as an example, there is shown a format 40 of a file of the Windows BMP (bitmap file).

In FIG. 12, a head field 41 of this format 40 stores an ASCII code (0x42, 0x4d) of a character "BM" indicative of a bitmap file. A field 42 subsequent to the head field 41 stores data representative of a size (byte number) of the bitmap file. Another field 43 subsequent to the field 42 stores data indicative of a starting position of the bitmap data.

A field 44 next to the field 43 stores data indicative of a width of the bitmap. This width implies a total pixel number of an image along a width direction (X direction). Another field 45 subsequent to the field 44 stores data indicative of a height of the bitmap. This height implies a total pixel number of the image along a height direction (Y direction). Another field 46 subsequent to the field 45 holds data representative of an index number of the color table 47. This index number implies a total table entry number of color information held in the color table 47.

A field subsequent to the field 46 constitutes a color table 47. This color table 47 corresponds to either the color table 2 shown in FIG. 1, or the extended color table 2A indicated in FIG. 5. The color table 47 contains a plurality of table entries 48, the total number of which is equal to the index number stored in the field 46.

The respective table entries 48 own the same sizes, and all of these table entries 48 are arrayed under continuous states. As a result, each of the table entries 48 may be specified by checking that a relevant table entry is located on which position defined from the head of the color table 47 (namely, is located on which byte). The positional information (address) of the respective table entries 48 correspond to index values allocated to the respective table entries 48.

The respective table entries 48 hold information (namely color information, for example, RGB values) indicative of any of the colors used in the bitmap (image). As a result, the index number held in the field 46 represents a total number of colors used in the image represented by the bitmap file.

A field 49 subsequent to the color table 47 stores bitmap data. This bitmap data corresponds to either the image data 3 shown in FIG. 1 or the image data 3A shown in FIG. 7.

The field 49 is provided with a plurality of elements 50. A total number of these elements 50 is equal to such a quantity (width X height) calculated by multiplying the width (pixel number) of the bitmap held in the field 44 by the height (pixel number) of the bitmap held in the field 45. The elements 50 correspond to the elements 5 indicated in FIG. 3 and FIG. 7. Each of the elements 50 owns an index value corresponding to color information of a coordinate value (pixel) of a bitmap. In other words, the bitmap data stored in the field 49 hold the recording positions (addresses) of the color information of the respective pixels which constitute the image.

In this example, while a coordinate value of (0, 0) is defined as an origin, the coordinate values of the bitmap take values defined from (0, 0) up to (cx, cy). Each of the elements 50 has a size of 1 byte. A starting position of the element 50 corresponding to the color information of the coordinate value (cx, cy) constitutes such a position corresponding to a value obtained by subtracting 1 byte from the byte number indicated in the field 42.

Flow Operation of Application Program 30

Figure 13:
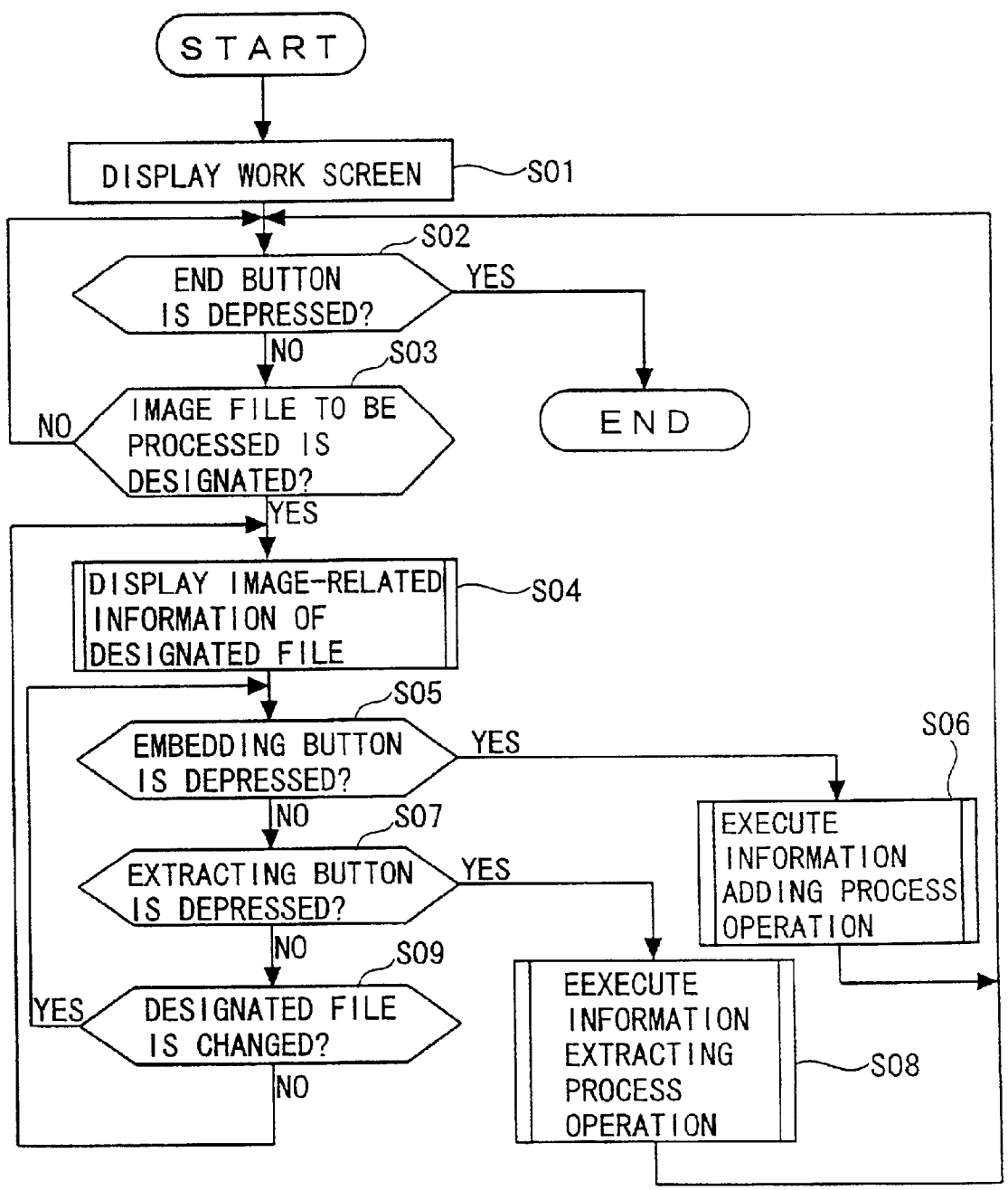
FIG. 13 is a flow chart for describing a main routine of the process operation of the computer shown in FIG. 10.

FIG. 13 to FIG. 18 are flow charts for describing process operations executed in the case that the CPU 23 shown in FIG. 10 performs the application program 30. FIG. 13 is such a flow chart for explaining a main routine of the application program 30.

This main routine is commenced in such a manner that, for example, the operator of the computer 22 inputs an execution starting instruction of the application program 30. It should be noted that the process operations shown in FIG. 13 to FIG. 18 describe such an example that 1 bit is embedded with respect to 1 pixel of an image data (namely, unit bit is 1 bit).

In FIG. 13, the CPU 23 first displays the work screen 31 shown in FIG. 11 on the display unit 29 (step S01).

Next, the CPU 23 judges as to whether or not the end button 39 of the work screen 31 is depressed (S02). When the CPU 23 judges that this end button 39 is depressed, the execution of the application program 30 is ended.

To the contrary, in the case that the CPU 23 judges that the end button 39 is not depressed, the CPU 23 waits for a designation of an image file (designated file) which should be processed by either the information adding process operation or the information extracting process operation by employing the display area 32 and/or the reference button 32a (namely, loop process defined by steps S02 and S03).

Thereafter, when the designated file is designated, the CPU 23 executes a subroutine of an image-related information display process operation of the designated file (S04). Further, the CPU 23 displays an image preview of the designated file on the display area 33 of the work screen 31, and displays the related information of the designated file on the display area 34.

Next, the CPU 23 judges as to whether or not the embedding button 37 of the work screen 31 is depressed (S05). When it is so judged that the embedding button 37 is depressed, the CPU 23 executes a subroutine of the information adding process operation with respect to the designated file (S06), and thereafter, returns the information adding process operation to the step S02. To the contrary, when the CPU 23 judges that the embedding button 37 is not depressed, the process operation is advanced to a further step S07.

At this step S07, the CPU 23 judges as to whether or not the extracting button 38 of the work screen 31 is depressed. When it is so judged that the extracting button 38 is depressed, the CPU 23 executes a subroutine of the information adding process operation with respect to the designated file (S08), and thereafter, returns the information adding process operation to the step S02. To the contrary, when the CPU 23 judges that the extracting button 38 is not depressed, the process operation is advanced to a further step S09.

At this step S09, the CPU 23 judges as to whether or not the designated file is changed. When the designated file is not changed (NO at step S09), the process operation is returned to the previous step S05. To the contrary, when the designated file is changed (YES at step S09), the process operation is returned to the previous step S04.

Figure 14:
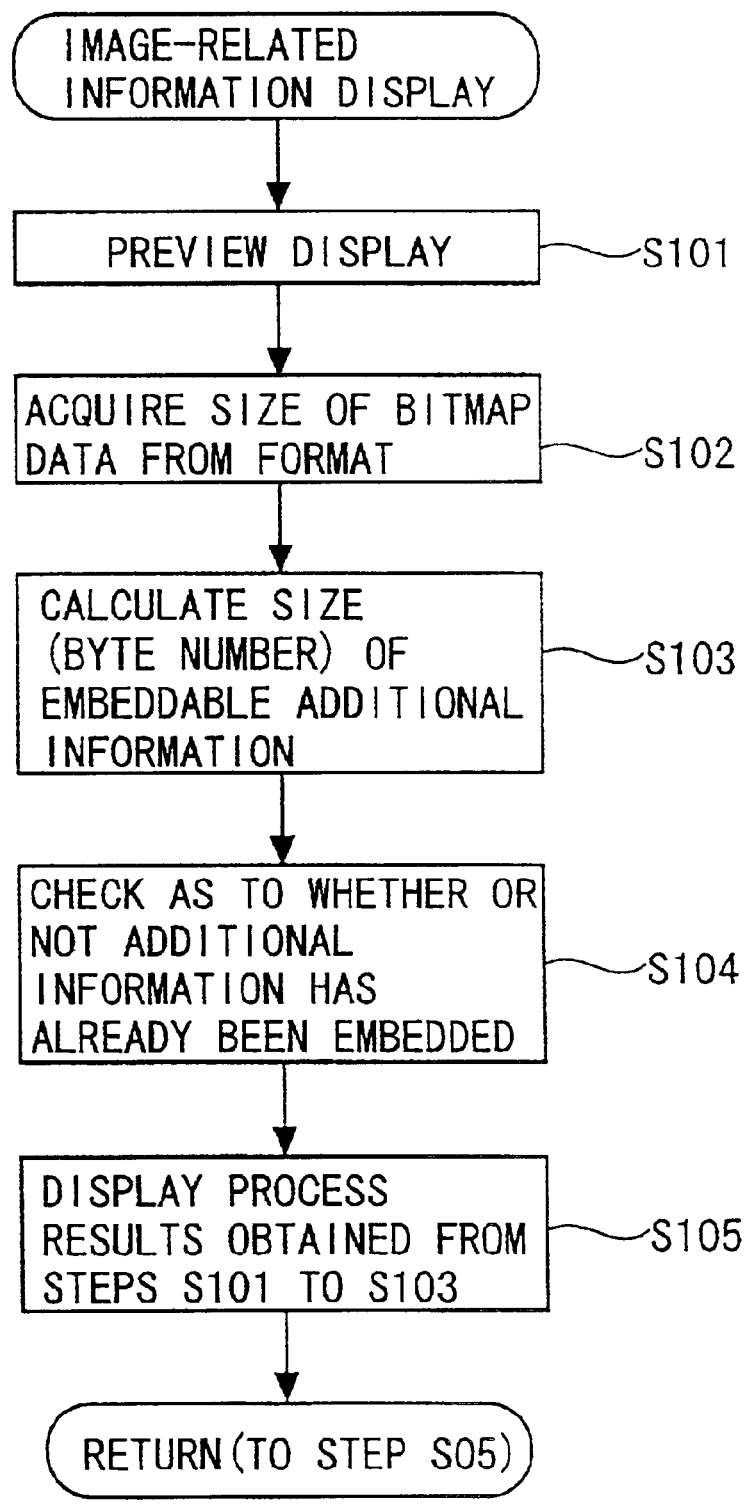
FIG. 14 is a flow chart for describing an image-related information display process operation shown in FIG. 13.

FIG. 14 is a flow chart for describing the subroutine (step S04) of the related information display process operation of the designated file shown in FIG. 13. In FIG. 14, the CPU 23 first copies the designated file from the external storage apparatus 25 to the MM 24, and executes the display control process operation with respect to the designated file, so that the CPU 23 displays a preview of an image represented by image data of the designated file on the display area 33 (S101).

Next, the CPU 23 acquires a size of bitmap data (image data) from the format 40 of the designated file (see FIG. 12) at a step S102. In other words, the CPU 23 acquires both a pixel number of the bitmap data along the width direction and a pixel number of this bitmap data along the height direction from both the field 44 and the field 45 of the format 40 for the designated file which is copied on the MM 40.

Subsequently, the CPU 23 calculates a size (byte number) of additional information which may be embedded, or added (S103). In other words, the CPU 23 multiplies the acquired pixel number along the width (X) direction by the acquired pixel number along the height (Y) direction to obtain a total pixel number, and then divides this total pixel value by 8 (namely, conversion from bit number to byte number).

Next, the CPU 23 checks as to whether or not the additional information has already been embedded into the designated file (S104). In other words, the CPU 23 compares RGB values held in the head (firstly stored) table entry 48 (assumed as index value "1") of the color table 47 with RGB values held in the table entry 48 (assumed as index value "A"), the order of which from the head tale entry is defined by dividing a total number (assumed as "N") of indexes by 2.

Next, the CPU 23 compares RGB values of the table entry 48 having an index value "2" with RGB values of the table entry 48 having an index value "A+1." Next, the CPU 23 compares RGB values of the table entry 48 having an index value "3" with RGB values of the table entry 48 having an index value "A+2."

An explained above, while the CPU 23 compares RGB values of a table entry 48 having an index value "A–1" with RGB values of a table entry (last table entry) 48 having an index value "N", this CPU 23 continuously performs the above-described process operation until the end of comparisons.

Then, when all of the compared RGB values are identical to each other, the CPU 23 judges that the additional information has already been embedded into the designated file. This is because the color table 47 has the structure of the extended color table 2A shown in FIG. 5. To the contrary, when the compared RGB values are different from each other, the CPU 23 judges that the additional information has not yet been embedded into the designated file. This is because the color table 47 owns the structure of the color table 2 (see FIG. 2).

Alternatively, the above-described process operation defined at the step S104 may be modified as follows: That is, when the CPU 23 may detect that the compared RGB values are different from each other, the CPU 23 may judge that the additional information has not yet been embedded. Also, while the CPU 23 judges as to whether the index number corresponds to an odd number, or an even number, when the index number corresponds to the odd number, the CPU 23 may judge that the information has not yet been embedded into the designated file.

When the CPU 23 acquires the size of the bitmap data, the size of the embeddable information, and the check result as to whether or not the additional information has been embedded (namely, stored into MM 24), this CPU 23 displays these data as the image-related information on the display area 34 of the work screen 31 (S105). Thereafter, the CPU 23 accomplishes the execution of this image-related information display process operation, and then, the process operation is returned to the previous step S05 of FIG. 13.

It should be understood that in the image-related information display process operation shown in FIG. 14, the unit bit corresponds to 1 bit. Alternatively, in the case that the unit bit is equal to, for example, 2 bits, the byte number made from the calculation result of (pixel number along width direction)×(pixel number along height direction)/4 may be calculated as the size of the embeddable additional information in the process operation defined at the step S103.

Also, in such a case that the unit bit is equal to 2 bits, in the process operation defined at the step S104, comparisons should be carried out as to a plurality of table entries 48 of the color table 47 with respect to the respective RGB values of the four corresponding table entries 48 in such a comparison position, for instance, the table entry 48 at the head position, the table entry 48 at the 1/4 position, the table entry 48 at the 2/4 position, and the table entry 48 at the 3/4 position. Then, the CPU 23 judges as to whether or not these compared RGB values are identical to each other.

Figure 15:
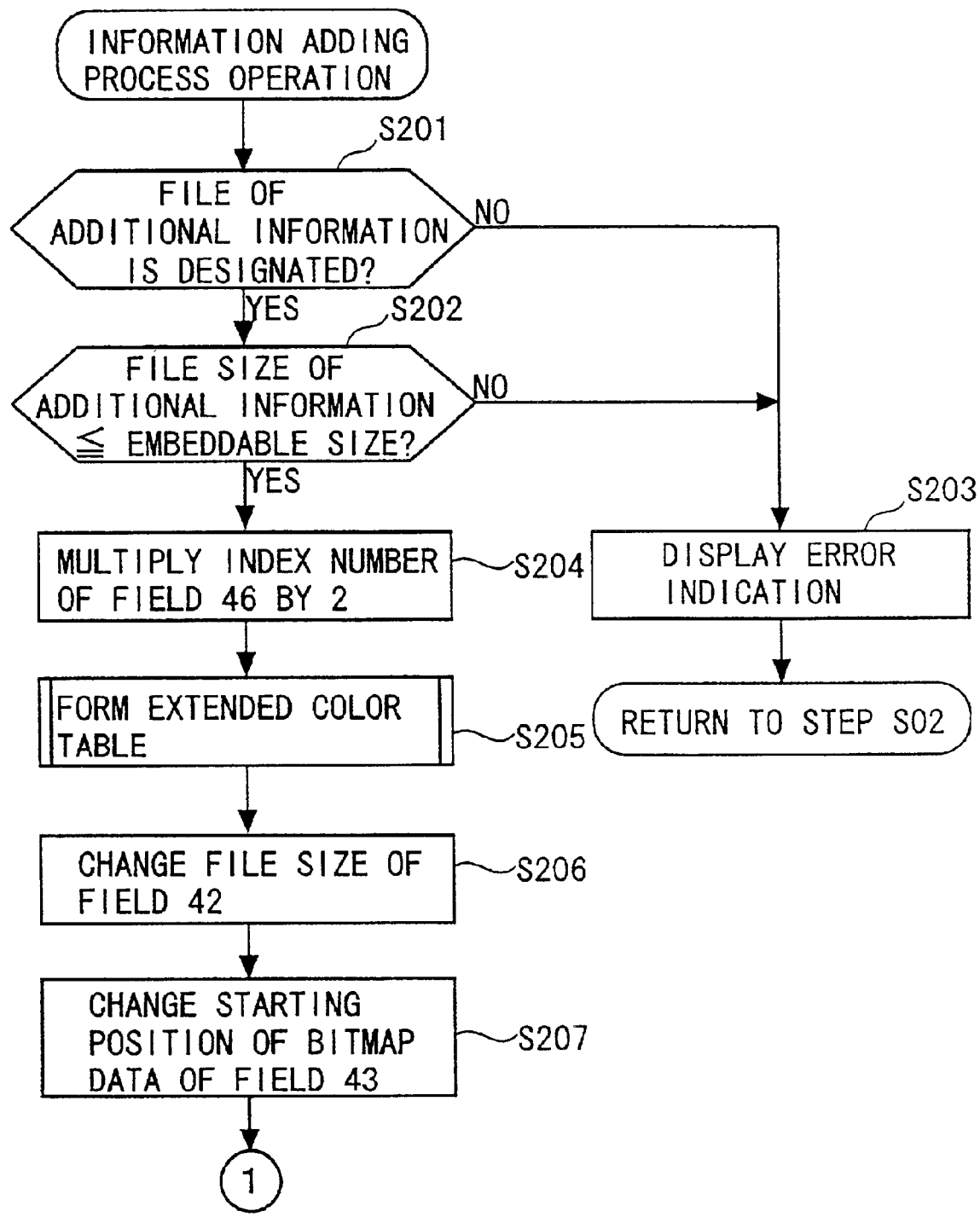
FIG. 15 is a flow chart for describing an information adding process operation shown in FIG. 13.
Figure 16:
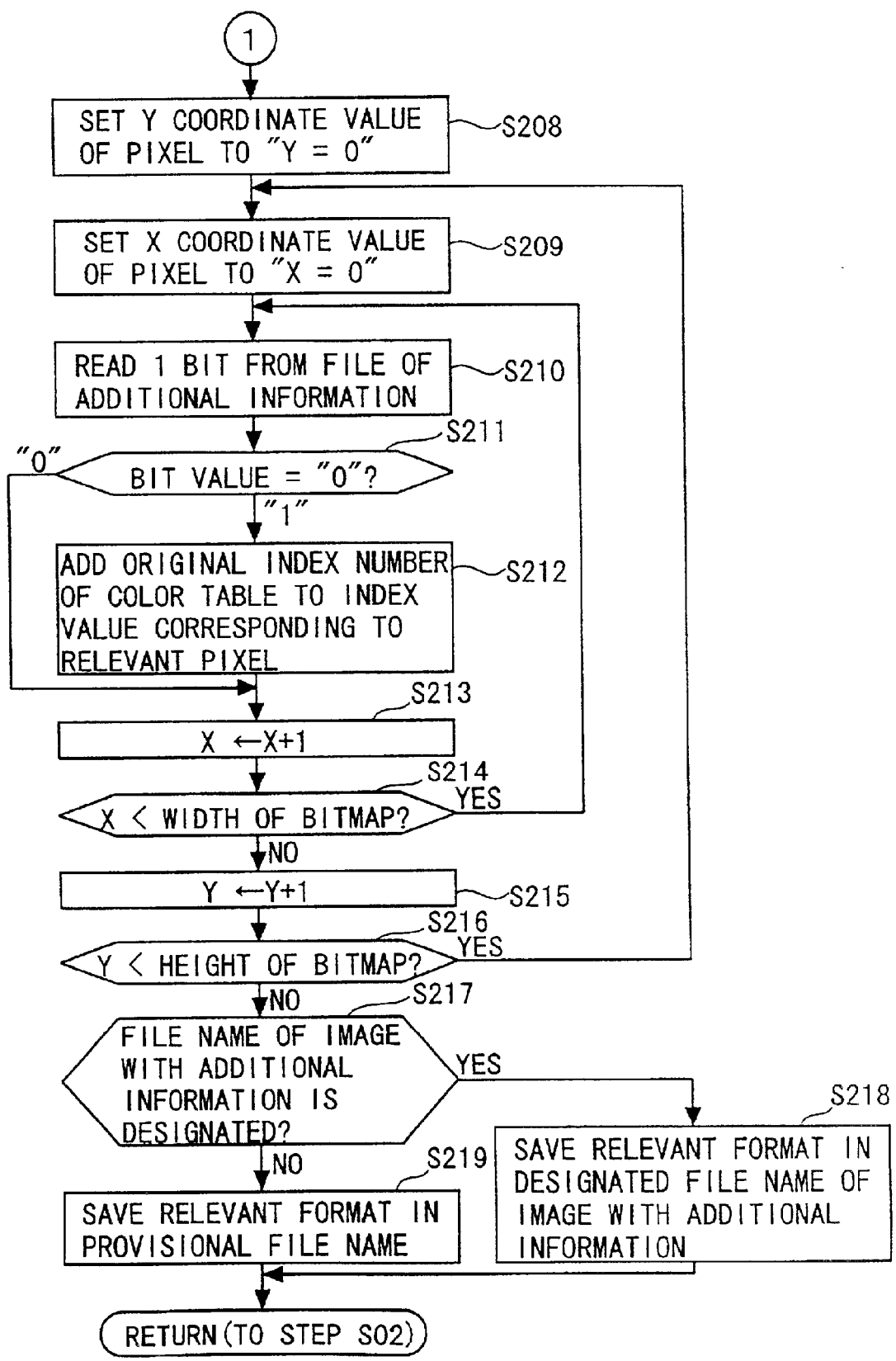
FIG. 16 is a flow chart for describing an information adding process operation shown in FIG. 13.

FIG. 15 and FIG. 16 are flow charts for describing contents of the information adding process operation (step S06) shown in FIG. 13. In FIG. 15, the CPU 23 checks as to whether or not the designated file corresponds to the image file of the original image 14 (namely, whether or not additional information is embedded) by that this CPU 23 refers to the check result of the step S104 saved in the MM 24, although not shown in the drawing. In the case that the designated file is not equal to the image file of the original image 14, the CPU 23 executes an error display process operation, and thereafter, the information adding process operation is returned to the previous step S02.

To the contrary, in such a case that the designated file corresponds to the image file of the original image 14, the CPU 23 judges as to whether or not a file of additional information embedded in the designated file is designated by employing the display area 35 and/or the reference button 35*a* (S201).

At this time, when the file of the additional information is not designated (NO at step S201), the CPU 23 displays such an error indication that the file of the additional information is not designated on the display unit 29 (S203) so as to prompt the operator to designate the file of the additional information. Thereafter, the process operation is returned to the previous step S02.

To the contrary, when the file of the additional information is designated (YES at step S201), the CPU 23 judges as to whether or not the file size (byte number) of the additional information is smaller than, or equal to such a byte number which may be embedded in the designated file (S202).

At this time, in the case that the byte number of the additional information exceeds the embeddable byte number, the CPU 23 advances the process operation to the step S203. At this step S203, the CPU 23 displays on the display unit 29, such an error indication that since the size of the additional information becomes too large, this additional information cannot be embedded in the designated file. Thereafter, the process operation is returned to the step S02.

To the contrary, in such a case that the byte number of the additional information is smaller than, or equal to the embeddable byte number, the CPU 23 sets the value of the index number to twice the value thereof (S204). This index number is held in the field 46 of the format 40 of the designated file read out on the MM 24.

Next, the CPU 23 executes an extended color table forming process operation. In other words, the CPU 23 sets the size of the color table 47 to the twice size thereof (multiply table entry group by 2), and stores the RGB values held in the table entry 48 of the index value "1" into the table entry 48 of the index value "N+1."Subsequently, the CPU 23 stores the RGB values held in the table entry 48 of the index value "2" into the table entry 48 of the index value "N+2."

As explained above, the RGB values held in the respective table entries 48 of the index values "1" to "N" are copied to the respective table entries 48 of the index values "N+1" to "2N."

As a consequence, the color table 47 may constitute such an extended color table which is arranged by a first table entry group 47A (corresponding to non-extended portion 2*a* of FIG. 5, see FIG. 22) which is made of the table entry 48 having the index values "1" to "N", and a second table entry group 47B (corresponding to extended portion 2*b* of FIG. 5, see FIG. 22) which is made of the table entry 48 having the index values "N+1" to "2N."

Next, the CPU 23 adjusts the file size of the bitmap file held in the field 42 (S206). For instance, the CPU 23 sets the file size to be increased by the size of the second table entry group 47B which is increased when the extended color table is formed.

Subsequently, the CPU 23 adjusts the starting position of the bitmap data held in the field 43 (S207). For instance, the CPU 23 sets this starting position along the backward direction by the byte number of the second table entry group 47B. This is because the starting position of the bitmap data is decreased while the color table 47 is extended.

Next, the CPU 23 specifies one coordinate value (pixel) of a processing subject from the bitmap data held in the field 49, and sets an index value corresponding to this pixel at steps S208 to S209.

In this example, the pixel of the processing subject may be specified in accordance with the below-mentioned manner. That is, the CPU 23 first specifies as an origin (coordinate value of "0, 0") such a pixel located at an upper left corner of a rectangular image which is specified by the designated file, and subsequently, the CPU 23 specifies a pixel located adjacent to this origin along the right direction (namely, pixel located on the same row and next column), namely, the CPU 23 changes the X coordinate value. While there is no pixel located on the right neighbor position, the CPU 23 specifies a pixel located on the leftmost position of the next row (namely, Y coordinate value is changed). While such a process operation is repeatedly carried out, the CPU 23 specifies such a pixel which is positioned on a lower right corner of the image.

To this end, the CPU 32 sets the Y coordinate value of the pixel to "y=0" (step S208), and also sets the X coordinate value of the pixel to "x=0" (step S209). As a consequence, the pixel having the coordinate value of (0, 0) may be specified as the processing subject by the CPU 23.

Next, the CPU 23 reads out 1 bit into the MM 24 from the file of the additional information (S210). This 1 bit is equal to the unit bit. In this example, at this step S210, with respect to the array of the bits which constitute the additional information held in the file of the additional information, the bits are sequentially read out in the unit of 1 bit from the head bit thereof.

Next, the CPU 23 judges as to whether the value of the read 1 bit is equal to "0", or "1" (S211). When the checked bit value is equal to "0", the process operation is advanced to a step S213, whereas when the checked bit value is equal to "1", the process operation is advanced to a step S212.

At the step S213, the CPU 23 adds the original index number of the color table 47 to the index value which is stored in the element 50 of the bitmap data corresponding to the pixel to be processed. For instance, when the index value stored in the element 50 is equal to "1", the CPU 23 adds the original index number "N" to the above index value so as to set the index value of this pixel to "N+1." Thereafter, the process operation is advanced to the step S213.

When the CPU 23 judges at the step S211 that the value of the unit bit is equal to "0", the index value of the element 50 corresponding to the specified pixel is not changed. As a result, the index value of the first table entry group 47A (non-extended portion 2*a*) corresponding to the unit bit value of "0" may be set with respect to the specified pixel.

To the contrary, when the value of the unit bit is equal to "1", since the CPU 23 executes the process operation defined at the step S212, the index value of the second table entry group 47B (extended portion 2*b*) corresponding to the unit bit value of "1" is set.

At the step S213, the CPU 23 adds 1 to the value of the x coordinate system. Next, the CPU 23 judges as to whether or not the value of this x coordinate system is smaller than, the width (namely, maximum value of x coordinate system) of the bitmap (S214). When the x coordinate value is smaller than the maximum value, the process operation is returned to the step S210. When the x coordinate value is larger than, or equal to the maximum value, the process operation is advanced to a step S215.

At the step S215, the CPU 23 adds 1 to the value of the y coordinate system. Next, the CPU 23 judges as to whether or not the value of this y coordinate system is smaller than, the height (namely, maximum value of y coordinate system) of the bitmap (S216). When the y coordinate value is smaller than the maximum value, the process operation is returned to the step S209. When the y coordinate value is larger than, or equal to the maximum value, the process operation is advanced to a step S217.

As previously explained, since the process operations defined from the steps S213 to S216 are carried out, a pixel which should be subsequently processed may be specified. Also, since the loop process operations defined from the step S209 to S216 are carried out, any one of the index value of the first table entry group 47A and the index value of the second table entry group 47B is set in accordance with the value of the unit bit with respect to all of the pixels (coordinate values) contained in the bitmap data. As a result, the image file to which the additional information has been added (image file with additional information) may be formed in the MM 24.

In this case, in such a case that the value of the unit bit is equal to "1", such a value obtained by adding the original index number to the original index value is newly set as an index value at the step S212. RGB values which are retrieved based upon this newly set index value are identical to such RGB values which are retrieved based on the original RGB values.

At the step S217, the CPU 23 judges as to whether or not the file name of the image with the additional information is designated on the work screen 31. When this file name is designated, the process operation is advanced to a step S218. To the contrary, when this file name is not designated, the process operation is advanced to a step S219.

At the step S218, the CPU 23 stores (records) the format 40 of the image file with the additional information saved in the MM 23 into a preselected storage position of the external storage apparatus 25 in the name of such a file name of the designated image with the additional information.

On the other hand, at the step 219, the CPU 23 stores (records) the format 40 of the image file with the additional information saved in the MM 23 into a predetermined storage position of the external storage apparatus 25 in the name of a provisional name. When the process operation defined at either the step S218 or the step S219 is accomplished, the information adding process operation is ended, and then, the process operation is returned to the step S02 of FIG. 3.

The provisional name used at the step S219 may be produced in such a manner that a certain file name may be automatically set, or such a file name formed by altering a designated file may be automatically set. Alternatively, a designated file may be updated by the image file with the additional information.

Also, since the formed image file with the additional information is not changed from the normal bitmap file as the format 40, this formed image file is handled as the bitmap file. Since the image file with the additional information is processed by executing the image display control process operation with respect to the conventional bitmap file, the image may be displayed on the display unit 29 based the image file with the additional information.

Information Extracting Operation

Figure 17:
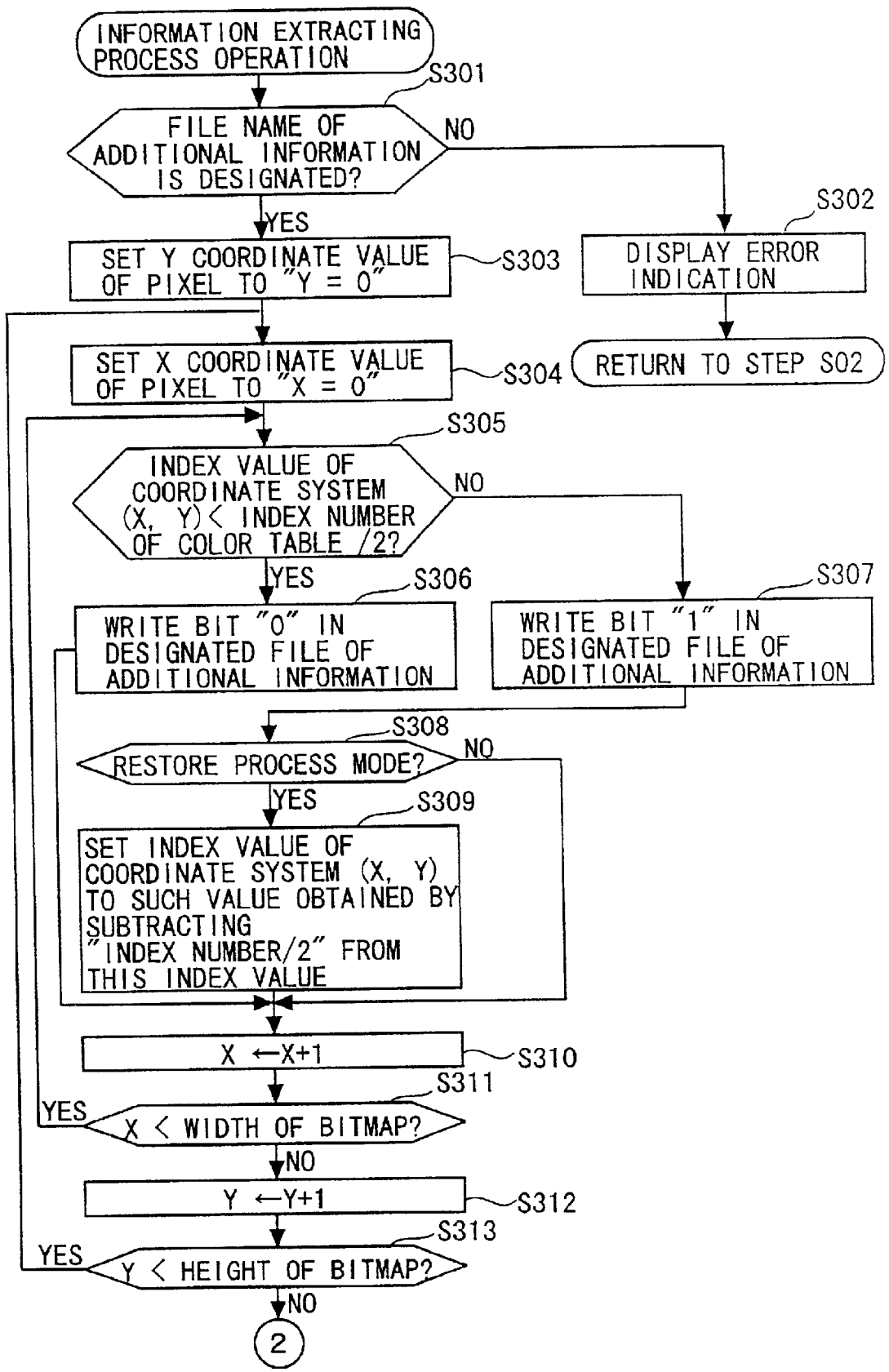
FIG. 17 is a flow chart for explaining an information extracting process operation indicated in FIG. 13.
Figure 18:
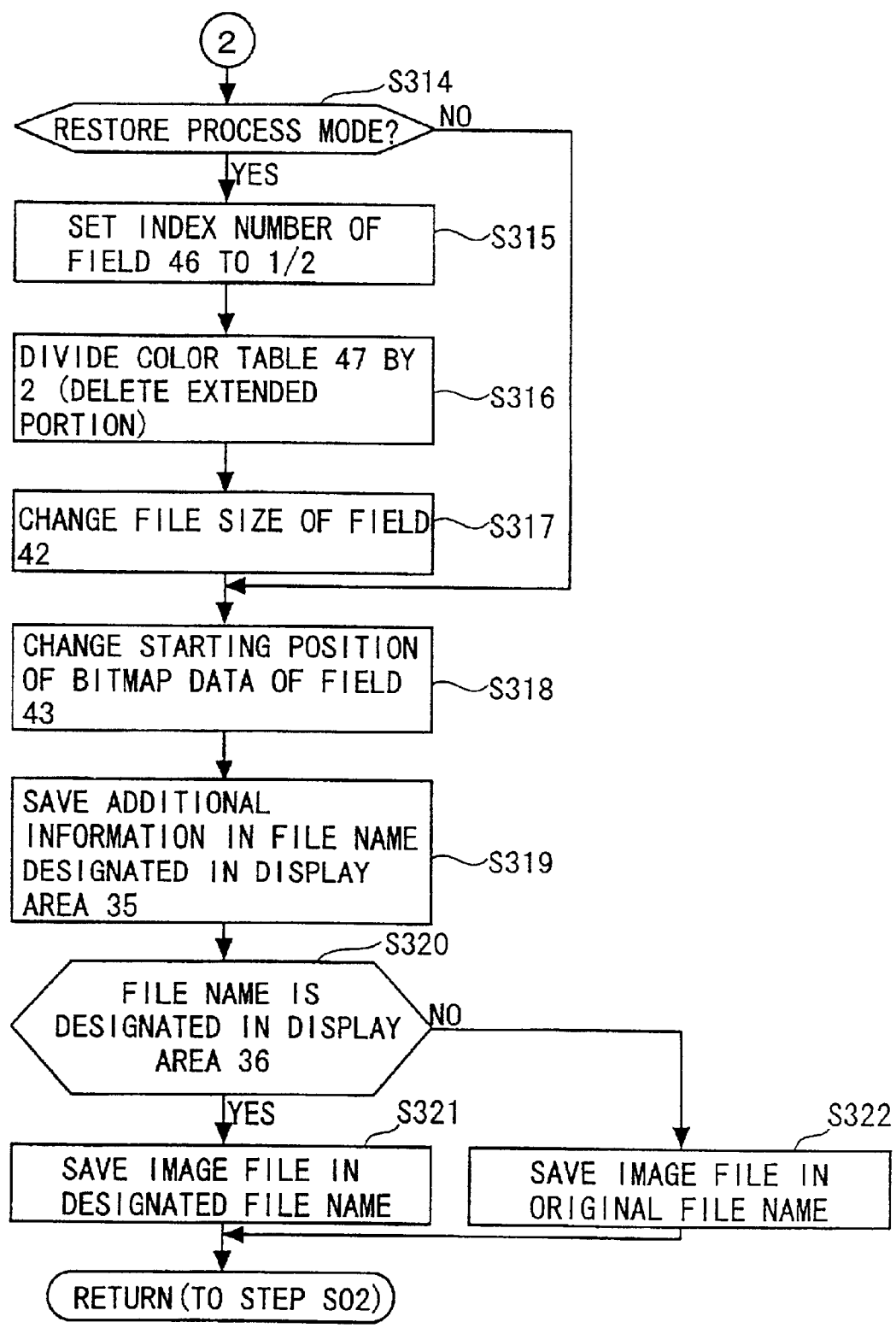
FIG. 18 is a flow chart for explaining an information adding process operation indicated in FIG. 13.

FIG. 17 and FIG. 18 are flow charts for explaining contents of the information extracting process operations (defined at step S08) shown in FIG. 13. In the flow chart of FIG. 17, the CPU 23 judges as to whether or not a designated file corresponds to the image file of the image with the additional information 16 by referring to the check result of the step S104 which is saved in the MM 24, although not shown in the drawing. That is, the CPU 23 judges as to whether or not the additional information is embedded in the designated file. In the case that the designated file is not equal to the image file of the image with the additional information 16, the CPU 23 executes an error indication process operation, and thereafter, the process operation is returned to the step S02. To the contrary, when the designated file corresponds to the image file with the additional information, the CPU 23 separates the color table 47 into both the first table entry group 47A and the second table entry group 47B in accordance with the check result of the step S104.

Next, the CPU 23 judges as to whether or not the file name of the additional information is designated on the work screen 31 (S301). At this time, in the case that the file name of the additional information is not designated, the CPU 23 displays with an error indication that the file name of the additional information should be designated on the display unit 29. Then, the process operation is returned to the step S02 of FIG. 13.

To the contrary, when the file name of the additional information is designated, the CPU 23 sets the y coordinate value of the pixel to "y=0" (step S303), and also sets the pixel to "x=0" (step S304). As a result, such a condition is set that a pixel of a coordinate value (0, 0) of the bitmap data saved in the field 49 of the image file with the additional information is specified as the process subject.

Next, the CPU 23 judges as to whether or not an index value of the element 50 corresponding to the specified coordinate value (pixel) is smaller than a value obtained by dividing a total number of indexed by 2 (S305). As a result, the CPU 23 may judge that the index value belongs to any one of the first table entry group 47A and the second table entry group 47B.

At the step S305, when the index value of the specified coordinate system can satisfy the above-explained condition, the CPU 23 advances the process operation to the step S306. To the contrary, when this index value does not satisfy the above-explained condition, the CPU 23 advances the process operation to the step S307.

At the step S306, the CPU 23 writes the unit bit value of "0" corresponding to the first table entry group 47A with respect to the designated file of the additional information. Thereafter, the process operation is advanced to a step S310.

At the step S307, the CPU 23 writes the unit bit value of "1" corresponding to the second table entry group 47B with respect to the designated file of the additional information. Thereafter, the process operation is advanced to a step S308.

At the step S308, the CPU 23 judges as to whether or not a restore process mode is set to the information extracting process operation. This restore process mode corresponds to such a mode that after the additional information is derived from the image with the additional information 16, this image with the additional information 16 is restored to the original image 14.

At the step S308, when the restore process mode is not set, the process operation is advanced to a step S310. To the contrary, when the restore process mode is set at this step S308, the CPU 23 sets the index value of the specified coordinate (pixel) to such a value obtained by subtracting an "index number/2 (namely, original index number)" from this index value (S309), and then, the process operation is advanced to a further step S310.

With execution of the process operation defined at the step 309, the index value of the specified coordinate (pixel) is changed from the index value of the second table entry group 47B into such an index value of the first table entry group 47A which indicates the same RGB values.

At the step S310, the CPU 23 adds 1 to the value of the x coordinate system. Next, the CPU 23 judges as to whether or not the value of this x coordinate system is smaller than the width (namely, maximum value of x coordinate system) of the bitmap (S311) When the x coordinate value is smaller than the maximum value, the process operation is returned to the step S305. When the x coordinate value is larger than, or equal to the maximum value, the process operation is advanced to a step S312.

At the step S312, the CPU 23 adds 1 to the value of the y coordinate system. Next, the CPU 23 judges as to whether or not the value of this y coordinate system is smaller than the height (namely, maximum value of y coordinate system) of the bitmap (S313). When the y coordinate value is smaller than the maximum value, the process operation is returned to the step S304. When the y coordinate value is larger than, or equal to the maximum value, the process operation is advanced to a step S314 of FIG. 18.

Since the loop process operations defined from the step S304 to the step S313 are carried out, with respect to the respective pixels contained in the bitmap data of the image with the additional information 16, the values of the unit bits are calculated which correspond to the index value of the elements 50 corresponding to the relevant pixels. Then, the calculated unit bits are recorded on the file of the designated additional information. As a result, an array of bits which constitute the additional information may be formed which is added to the image with the additional information.

Since the respective index values saved in the bitmap data of field 49 of the image with the additional information are changed into the index values of the first table entry group 47A by executing the process operation defined at the step S309, the content of the bitmap data saved in the field 49 may be restored in the content of the bitmap data of the original image 14. In other words, this is the same condition that the image data 3A is altered into the image data 3.

At the step S314, the CPU 23 checks as to whether or not the present mode corresponds to the restore process mode. When the present mode is not equal to the restore process mode, the process operation is advanced to a step S319. To the contrary, when the present mode corresponds to the restore process mode, the process operation is advanced to a further step S315.

At this step S315, the CPU 23 sets a total index number of the field 46 of the format 40 to a half value thereof. Subsequently, the CPU 23 divides the color table 47 by 2. In other words, the CPU 23 deletes such a portion equivalent to the second table entry group from the color table 47B so as to cut a space between the color table 47 and the field 48. While the process operation defined at the step S315 is carried out, the extended portion 2b of the color table 47 is deleted from the extended color table 2A, and thus, it becomes such a same condition that the color table 2 may be restored.

Next, the CPU 23 changes a size of a bitmap file held in the field 42 (S317). For example, the CPU 23 newly sets such a value obtained by subtracting the size of the second table entry group 47B deleted at the step S315 from the present size.

Next, the CPU 23 changes a starting position of the bitmap data of the field 43 (S318). For example, the CPU 23 sets the starting position of this bitmap data to a front position by the deleted byte number of the second table entry group 47B. With execution of the above-explained process operation, the image file of the original image 14 may be restored from the image with the additional information 16.

Next, the CPU 23 stores (records) the file of the additional information held in the MM 24 into a preselected storage area of the external storage apparatus 25 by using the file name designated in the display area 35.

Subsequently, the CPU 23 judges as to whether or not a file name is designated in the display area 36 (S320). When the file name is designated, the CPU 23 stores either the image file of the image with the additional information 16 or the image file of the restored original image 14 into a predetermined storage area of the external storage apparatus 25 in the name of this designated file name (S321).

To the contrary, when the file name is not designated, the CPU 23 stores either the image file of the image with the additional information 16 or the image file of the restored original image 14 into a predetermined storage area of the external storage apparatus 25 in the file name of the original image with the additional information 16 (S02).

When the process operation defined at either the step S321 or the sets S322 is accomplished, this information extracting process operation is ended, and the main processing operation is returned to the previous step S02 of FIG. 13. Thereafter, the operator may use the additional information which has been recorded on the files of the additional information in a proper field.

In the above-described information adding process operation shown in FIG. 15 and FIG. 16, the unit bit is selected to be 1 bit. Alternatively, in the case that the unit bit is selected to be, for example, 2 bits, while a plurality of table entries 48 of the color table is multiplied by 4 so as to form first to fourth table entry groups, any of the index values saved in the first to fourth table entry groups may be set to the respective pixels of the bitmap data in accordance with the unit bit values "00", "01", "10", "11".

Also, in the information extracting process operation shown in FIG. 17 and FIG. 18, when the file name of the additional information is not designated, this information extracting process operation is not carried out. With respect to this arrangement, the information extracting process operation may be furthermore carried out only when a preselected file name is designated as the file of the additional information. In this alternative case, the file name of the additional information may be used as a password for extracting the additional information.

Operations of Embodiments

Next, operation of the above-explained embodiments will now be described. FIG. 19 is a diagram for illustratively indicating an example of an image (i.e., image 51) represented by a bitmap file. The image 51 is constituted by 16 pixels (=4 pixels×4 pixels). The respective pixels are represented by using colors corresponding to RGB values (either "0" or "128" in the example of FIG. 13) which are allocated to the respective pixels.

Figure 20:
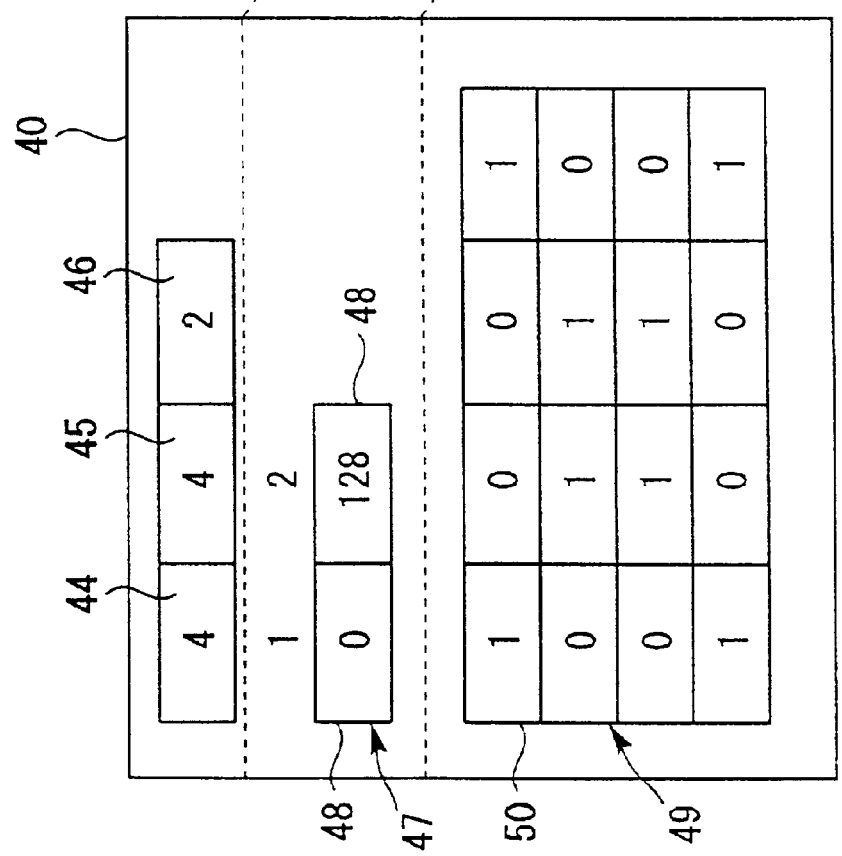
FIG. 20 is an explanatory diagram for explaining operation of an embodiment of the present invention.
Figure 21:
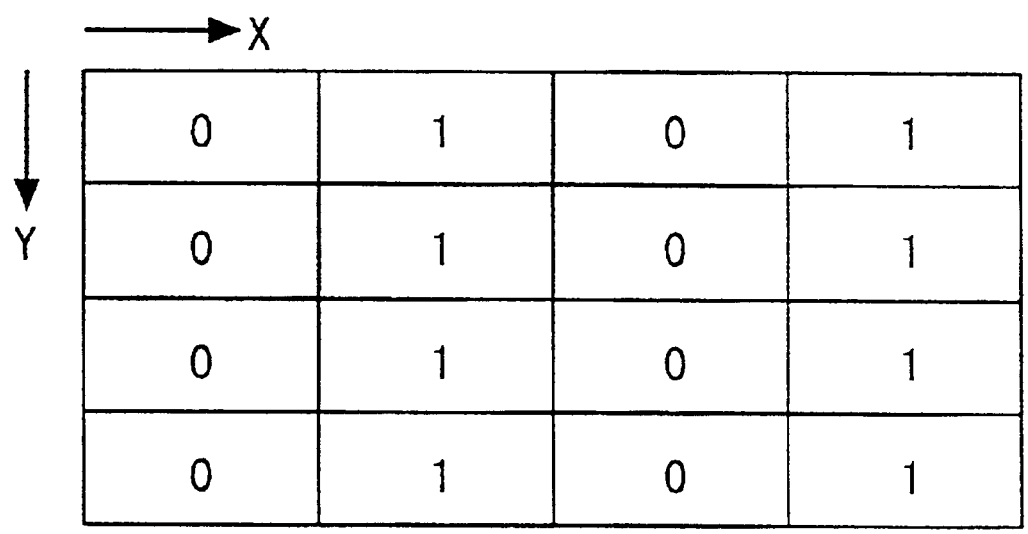
FIG. 21 is an explanatory diagram for explaining operation of an embodiment of the present invention.

FIG. 20 is a diagram for indicating an image file of the image 51 shown in FIG. 19 in accordance with the format 40 indicated in FIG. 12. FIG. 21 is a diagram for representing a correspondence relationship among an array of bits which are added as additional information to the image 51 shown in FIG. 19, and the respective bits, and also the respective pixels of the image 51.

In the example shown in FIG. 21, the unit bit is 1 bit, a head bit is allocated to an upper left pixel, and a next bit is allocated to a pixel located in the same row and in the next column. Thereafter, in the case that there is no pixel located in the same row and in the next column, the next bit is allocated to a pixel located in the next row and in a head column.

FIG. 22 is a diagram for illustratively indicating the format 40 just after the process operation of the step S204 (see FIG. 15) has been carried out in order to embed the additional information shown in FIG. 21. Since the process operation defined at the step S204 is carried out, the color table 47 is extended, and both the first table entry group 47A (respective table entries 48 of index values "1" and "2"), and the second table entry group 47B (respective table entries 48 of index values "3" and "4") are produced.

FIG. 23 is a diagram for illustratively indicating such a condition that while the process operations defined from the steps S208 to S214 of FIG. 16 are carried out, the bits up to the fourth bit of the bit array (bit stream) shown in FIG. 21 are embedded into pixels defined from a first pixel up to a fourth pixel. As shown in FIG. 23, index values of both the second pixel and the fourth pixel in which the value of the allocated unit bit is equal to "1" are changed into the index values of the second table entry group 47B.

FIG. 24 is a diagram for illustratively showing such a condition that while the process operations defined from the step S208 to the step S216 of FIG. 16 are carried out, all bits of the bit array are embedded into the pixels of the image 51. FIG. 24 indicates the format 40 of the image with the additional information 16. As indicated in FIG. 24, index values of the respective pixels in which the value of the located unit bit is equal to "1" are changed into the index values of the second table entry group 47B.

Also, in FIG. 24, the RGB values designated by the respective index values held in the field 49 are not changed, as compared with the RGB values before the bit stream is embedded (see FIG. 20). As a result, there is completely no change between the representation mode of the image which is represented based upon the image with the additional information 16, and the representation mode of the image represented based on the original image 14.

In the image adding apparatus 10 of this embodiment, the information may be added to the image file, while there is completely no change in the representation modes of the image before/after the information is added to this image. As a consequence, the information may be embedded even with respect to such a simple image as a black/white binary image. Also, in accordance with the information extracting apparatus 17, the additional information can be derived from the image with this additional information to be utilized.

The information adding method and/or the information extracting method, according to the present invention may be applied to all of various services and various applications, for instance, albums and encryptions, while using images in information processing terminal units and the like capable of handling image files.

Since the present invention is applied to a so-called "album software program" capable of rearranging image files, images, voice, and descriptions may be made in correspondence with each other. Therefore, the present invention can develop various application software capable of having better representabilities.

In general, an image file of such an image with additional information is not different from a simple image file such as a bitmap file in view of a surfical observation. As a result, a third party can hardly become aware of such a fact that information has been added to an image file unless the image-related information display process operation is executed by employing the application program 30. Accordingly, information may be supplied/received between the relevant party, while the third party cannot become aware of such an image with additional information. As a consequence, encrypt application software having high secrecy could be developed. These application developments could achieve great contribution in developing new functions realized in services/application programs using computers.

Also, if the application program of the present invention may be adapted to the existing "image saving format using color table", then images can be displayed, so that the information adding/extracting methods of the present invention own compatibility with respect to the existing technique. Also, since the size of the color table merely becomes power of 2, the following merit may be achieved. That is, the size of the image file can be made small, as compared with such a case that information is merely added to an image file.

It should be understood in this embodiment that both the information adding apparatus 10 and the information extracting apparatus 17 are realized by the computer 22. Alternatively, any one of the information adding apparatus 10 and the information extracting apparatus 17 maybe realized by the computer 22. In other words, the application program 30 stored in the external storage apparatus 25 may be provided with one of a program portion capable of executing the information adding process operation and a program portion capable of executing the information extracting process operation.

Although the bitmap file has been described in this embodiment, a GIF file may be similarly utilized.

What is claimed is:

1. An information adding apparatus for adding additional information to an image file which contains a first table constructed of a table entry group to which index values are allocated, color information being defined to the respective table entries, and also contains image data in which the index values of said table entry group are set as color information of the respective pixels constituting an image, comprising:

a table producing unit producing a table entry of a second table based upon the table entry of said first table; and an image data producing unit specifying a table entry of a table in correspondence with said additional information as to each of the pixels for constituting said image, and producing image data in which an index value corresponding to said specified table entry is set.

2. An information adding apparatus as claimed in claim 1 wherein:

said table producing unit produces said second table in which the table entry group of said first table is copied in order to become power of 2 in response to a bit number of a unit bit which constitutes a unit in such a case that an array of bits indicative of said additional information is allocated to the respective pixels.

3. An information extracting apparatus for extracting additional information contained in an image file which should be processed, comprising:

a table analyzing unit segmenting a table entry group of a table in which color information is defined in correspondence with an index value into a plurality of table entry groups, said table entry groups of the table being contained in said image file; and an information extracting unit specifying said table entry groups which are allocated as to the respective index values set to the respective pixels of the image data contained in said image file, and acquiring values corresponding to the specified table entry groups to thereby produce additional information.

4. An information extracting apparatus as claimed in claim 3 wherein:

said information extracting unit acquires a value of a unit bit corresponding to said specified table entry group every pixel of said image data, and arranges the acquired unit bits in a predetermined order so as to produce an array of bits representative of said additional information.

5. An information extracting apparatus as claimed in claim 3, further comprising:

a restoring unit restoring both said table and said image data into such conditions thereof obtained before the additional information is added, after the additional information has been produced by said information extracting unit.

6. An information adding method for adding additional information to an image file which contains a first table constructed of a table entry group to which index values are allocated, color information being defined to the respective table entries, and also contains image data in which the index values of said table entry group are set as color information of the respective pixels constituting an image, comprising:

producing a table entry of a second table based upon the table entry of said first table; and specifying a table entry of a table in correspondence with said additional information as to each of the pixels for constituting said image, and producing image data in which an index value corresponding to said specified table entry is set.

7. An information adding method as claimed in claim 6 wherein:

in the producing the table entry of said second table, said second table is produced in which the table entry group of said first table is copied in order to become power of 2 in response to a bit number of a unit bit which constitutes a unit in such a case that an array of bits indicative of said additional information is allocated to the respective pixels.

8. An information extracting method for extracting additional information contained in an image file which should be processed, comprising:

segmenting a table entry group of a table in which color information is defined in correspondence with an index value into a plurality of table entry groups, said table entry groups of the table being contained in said image file; and specifying said table entry groups which are allocated as to the respective index values set to the respective pixels of the image data contained in said image file, and acquiring values corresponding to the specified table entry groups to thereby produce additional information.

9. An information extracting method as claimed in claim 8 wherein:

in the producing said additional information, a value of a unit bit corresponding to said specified table entry group is acquired every pixel of said image data, and arranges the acquired unit bits in a predetermined order so as to produce an array of bits representative of said additional information.

10. An information extracting method as claimed in claim 8, further comprising:

restoring both said table and said image data into such conditions thereof obtained before the additional information is added, after the additional information has been produced by said information extracting unit.

11. A computer readable recording medium for recording thereon a computer program used to cause a computer to execute a process operation for adding additional information to an image file which contains a first table constructed of a table entry group to which index values are allocated, color information being defined to the respective table entries, and also contains image data in which the index values of said table entry group are set as color information of the respective pixels constituting an image, said recording medium recording thereon such a program capable of causing the computer to execute:

a step for producing a table entry of a second table based upon the table entry of said first table; and a step for specifying a table entry of a table in correspondence with said additional information as to each of the pixels for constituting said image, and for producing image data in which an index value corresponding to said specified table entry is set.

12. A recording medium as claimed in claim 11 wherein:

said recording medium records thereon said program by which in the step for producing the table entry of said second table, said second table is produced in which the table entry group of said first table is copied in order to become power of 2 in response to a bit number of a unit bit which constitutes a unit in such a case that an array of bits indicative of said additional information is allocated to the respective pixels.

13. A computer readable recording medium for recording thereon a computer program used to cause a computer to execute a process operation for extracting additional information contained in an image file which should be processed, said recording medium recording thereon such a program capable of causing the computer to execute:

a step for segmenting a table entry group of a table in which color information is defined in correspondence with an index value into a plurality of table entry groups, said table entry groups of the table being contained in said image file; and a step for specifying said table entry groups which are allocated as to the respective index values set to the respective pixels of the image data contained in said image file, and for acquiring values corresponding to the specified table entry groups to thereby produce additional information.

14. A recording medium as claimed in claim 13 wherein:

said recording medium records thereon said program by which in the step for producing said additional information, a value of a unit bit corresponding to said specified table entry group is acquired every pixel of said image data, and arranges the acquired unit bits in a predetermined order so as to produce an array of bits representative of said additional information.

15. A recording medium as claimed in claim 13 wherein:

said recording medium records thereon said program which further comprises a step for restoring both said table and said image data into such conditions thereof obtained before the additional information is added, after the additional information has been produced by said information extracting unit.

16. A computer readable recording medium for recording thereon an image file to which additional information is added, wherein:

said image file contains both a table and image data;

said table is constituted of a plurality of table entry groups to which color information corresponding to index values is set respectively;

said image data holds index values corresponding to colors of respective pixels which represent an image; and said recording medium records thereon such an image file that the respective index values correspond to color information identical to color information corresponding to the respective index values which are set to the respective pixels of original image data, said original image data being equal to such image data to which a value corresponding to any one of said plurality of table entry groups is set in response to the additional information, and also before the additional information is added.

* * * * *